(12) United States Patent
Lee et al.

(10) Patent No.: US 11,787,448 B2
(45) Date of Patent: Oct. 17, 2023

(54) HYPERTUBE TRANSPORT SYSTEM

(71) Applicant: KRRI, Uiwang-si (KR)

(72) Inventors: Kwan Sup Lee, Gunpo-si (KR); Young Jun Jang, Suwon-si (KR); Jae Hoon Kim, Goyang-si (KR); Chang Young Lee, Bucheon-si (KR); Lee Hyeon Kim, Uiwang-si (KR); Min Hwan Ok, Uiwang-si (KR); Jeong Min Jo, Suwon-si (KR); Jin Ho Lee, Seoul (KR); Jung Youl Lim, Seoul (KR); Jae Heon Choe, Anyang-si (KR); Su Yong Choi, Suwon-si (KR)

(73) Assignee: KRRI, Uiwang-si (KR)

( * ) Notice: Subject to any disclaimer, the term of this patent is extended or adjusted under 35 U.S.C. 154(b) by 819 days.

(21) Appl. No.: 16/636,475

(22) PCT Filed: Aug. 28, 2018

(86) PCT No.: PCT/KR2018/009932
§ 371 (c)(1),
(2) Date: Feb. 4, 2020

(87) PCT Pub. No.: WO2019/045422
PCT Pub. Date: Mar. 7, 2019

(65) Prior Publication Data
US 2020/0239036 A1 Jul. 30, 2020

(30) Foreign Application Priority Data

Aug. 29, 2017 (KR) .......................... 10-2017-0109679
Sep. 19, 2017 (KR) .......................... 10-2017-0120298
(Continued)

(51) Int. Cl.
*B61B 13/10* (2006.01)
*B61B 13/00* (2006.01)
(Continued)

(52) U.S. Cl.
CPC .............. *B61B 13/00* (2013.01); *B61B 13/10* (2013.01); *B61C 3/02* (2013.01); *B61F 99/00* (2013.01);
(Continued)

(58) Field of Classification Search
CPC ......... B61B 13/00; B61B 13/10; B61B 13/08; B61C 3/02; B61F 99/00; B61H 11/10;
(Continued)

(56) References Cited

U.S. PATENT DOCUMENTS

| 6,418,857 | B1 * | 7/2002 | Okano | .................... | B60L 13/04 |
| | | | | | 104/284 |
| 2010/0031846 | A1 * | 2/2010 | Loser | ...................... | B60L 13/08 |
| | | | | | 104/281 |

(Continued)

FOREIGN PATENT DOCUMENTS

| CN | 101837790 | 9/2010 |
| JP | 09040942 | 2/1997 |

(Continued)

OTHER PUBLICATIONS

European Search Report—European Application No. 18850177.9 dated Mar. 18, 2021; citing KR 2010-0079019, JP 2012-238717, CN 101837790, and KR 2010-0090406.
(Continued)

*Primary Examiner* — Mark T Le
(74) *Attorney, Agent, or Firm* — CANTOR COLBURN LLP

(57) ABSTRACT

Provided is a hypertube transport system. Specifically, provided are a magnetically-levitated train and an infrastructure-system in which same travels, comprising: refrigerant for cooling compressed air of a hypertube train, and a compressed air cooling system utilizing the refrigerant; an apparatus and method for controlling trains operating in a (Continued)

US 11,787,448 B2
Page 2 vacuum tube; superconducting switches for superconducting magnets for magnetic levitation; a driving stability apparatus for the hypertube transport system; a control apparatus for trains of the hypertube transport system; and an energy harvester.

14 Claims, 35 Drawing Sheets

(30) Foreign Application Priority Data

| Dec. 13, 2017 | (KR) | 10-2017-0171135 |
|---|---|---|
| Dec. 20, 2017 | (KR) | 10-2017-0175810 |
| Dec. 21, 2017 | (KR) | 10-2017-0176656 |
| Dec. 21, 2017 | (KR) | 10-2017-0176658 |

(51) Int. Cl.
- *B61C 3/02* (2006.01)
- *B61F 99/00* (2006.01)
- *B61H 11/10* (2006.01)
- *H01F 6/04* (2006.01)
- *H01F 6/06* (2006.01)

(52) U.S. Cl.
CPC ............... *B61H 11/10* (2013.01); *H01F 6/04* (2013.01); *H01F 6/06* (2013.01)

(58) Field of Classification Search
CPC ..... H01F 6/04; H01F 6/06; H01F 6/00; Y02T 30/00; B60L 13/04; B60L 13/10; B60L 13/06; B60L 13/03; F16F 15/00; F16F 15/02; F16F 15/03

See application file for complete search history.

(56) References Cited

U.S. PATENT DOCUMENTS

| 2015/0255200 A1* | 9/2015 | Solovyov | H10N 60/30 335/216 |
|---|---|---|---|
| 2017/0312119 A1* | 11/2017 | Oh | A61F 7/007 |

FOREIGN PATENT DOCUMENTS

| JP | 2012238717 | 12/2012 |
|---|---|---|
| KR | 20100079019 | 7/2010 |
| KR | 20100090406 | 8/2010 |
| KR | 101015170 | 2/2011 |
| KR | 20110069391 | 6/2011 |
| KR | 20110074031 | 6/2011 |
| KR | 101130811 | 3/2012 |
| KR | 20160103862 | 9/2016 |

OTHER PUBLICATIONS

Hyper Loop Alpha, http://www.spacex.com/sites/spacex/files/hyperloop_alpha-20130812.pdf, 2013.

International Search Report—PCT/KR2018/009932 dated Dec. 14, 2018.

* cited by examiner

| Classification | Weight |
|---|---|
| Weight of existing water | 290kg |
| — | — |
| Total | 290kg |

| Classification | Weight |
|---|---|
| Weight of slush | 1.160kg |
| — | — |
| Total | 1.160kg |

Change in freezing point of propanediol (C3H8O2) and ethylene glycol (C2H6O2) according to concentration Compressor opening/closing vane and X° definition Flow gap blocking wave and Y° definition Table 1  BET data for SAP-iMPS-CC prepared for different times

| | SAP-iMPS-CC: 6 h | SAP-iMPS-CC: 48 h | SAP-iMPS-CC: 144 h |
|---|---|---|---|
| BET Surface Area (m$^2$/g) | 90.866 | 83.6183 | 152.4 |
| Pore Volume (cm$^3$/g) | 0.153906 | 0.772226 | 0.607289 |
| Average Pore Diameter (nm) | 4.6621 | 36.9405 | 15.9394 |

HYPERTUBE TRANSPORT SYSTEM

CROSS-REFERENCE TO RELATED APPLICATIONS

This application is a national entry of PCT Application No. PCT/KR2018/009932 filed on Aug. 28, 2018, which claims priority to and the benefit of Korean Application No. 10-2017-0109679 filed on Aug. 29, 2017; and Korean Application No. 10-2017-0120298 filed Sep. 19, 2017; and Korean Application No. 10-2017-0171135 filed Dec. 13, 2017; and Korean Application No. 10-2017-0175810 filed Dec. 20, 2017; and Korean Application No. 10-2017-0176658 filed Dec. 21, 2017; and Korean Application No. 10-2017-0176656 filed Dec. 21, 2017, in the Korean Patent Office, the entire contents of which are incorporated herein by reference.

TECHNICAL FIELD

The present invention provides a refrigerant for cooling compressed air in a hypertube transport system and a compressed air cooling system using the same.

More particularly, the present invention provides a refrigerant for cooling compressed air in a hypertube train, which is capable of reducing a volume of a cooling system by using a refrigerant, which is used in an intercooler for cooling the compressed air used for running of a hypertube transport system and produced by mixing water with propanediol and ethylene glycol at a certain ratio, and a compressed air cooling system using the same.

Also, the present invention provides a braking apparatus and method of a train vehicle that runs in a vacuum tube. More particularly, the present invention relates to a train vehicle running in a vacuum tube that is known as a hypertube or a hyperloop and effectively provides braking force to a train vehicle running in the vacuum tube.

Also, the present invention provides a superconducting switch for a magnetic levitation superconducting electromagnet.

More particularly, the present invention provides a superconducting switch for a magnetic levitation superconducting electromagnet using a thin film type high-temperature superconducting wire as an essential component for operating (exciting) the superconducting electromagnet in a permanent current mode.

Also, the present invention provides a vehicle driving stabilization apparatus of a hypertube transport system.

More particularly, the present invention provides a vehicle driving stabilization apparatus of a hypertube transport system, in which an elastic plate, a passive suspension, an active suspension, an electromagnetic force damper, and an aerodynamic adjustment vane are selectively installed in a vehicle running in a tube that is in a partial vacuum state to reduce an impact caused by various disturbances such as vibration, electromagnetic force, air resistance, an irregular air flow, and the like, which are caused by special vehicle running environments, thereby improving driving stability of the vehicle.

Also, the present invention provides a vehicle braking apparatus for a hypertube transport system.

More particularly, the present invention provides a vehicle braking apparatus of a hypertube transport system, in which a compressor opening/closing vane, a flow gap blocking vane, and a moisture expansion material are selectively installed at a front head-side of a vehicle running in a tube that is in a partial vacuum state to block a flow of air passing through the front head-side of the vehicle or block a flow of air passing through a gap between the vehicle and the tube, thereby braking the vehicle.

Also, the present invention provides a magnetic levitation train (hereinafter, referred to as a maglev train) including an energy harvester and an infrastructure system on which the maglev train runs.

More particularly, the present invention provides a maglev train including an energy harvester, in which the energy harvester for collecting various energy sources to produce power is disposed in the maglev train or the infrastructure system to improve driving stability of the train as well as the production of the power, and an infrastructure system on which the maglev train runs.

BACKGROUND ART

The background art related to a refrigerant for cooling compressed air in a hypertube transport system and a compressed air cooling system using the same will be described.

In general, the hypertube is a means of transporting a train at an ultra-high speed in an enclosed railway space that is in a vacuum state and called a tube, and the train running in the tube is called a tube train.

Such a tube train has been proposed and researched in various driving methods, such as a maglev manner or a wheel type ultra-high speed tube railway train, which is disclosed in Korean Patent Registration Nos. 10-1130812 and 10-1015170, and the like.

A degree of vacuum in the tube is about ⅓ to 1/1000, that is in a decompressed state. Since a compartment space within the train has to be maintained at atmospheric pressure, the tube train has to be sealed. At this time, cooling of heat is very important in the tube train moving on a vacuum tube line.

Meanwhile, FIGS. 1 and 2 are views illustrating a general hypertube train and a capsule train, and FIG. 3 is a configuration diagram of a compressed air cooling system that is applicable to the hypertube train.

According to this configuration, since an axial compressor is used in a hypertube train 2a running inside a hypertube 1a, compressed air rises to a temperature of about 600° C. and thus has to be cooled by using a cooling system. In this case, the cooling system according to the related art is designed so that water in a water reservoir is used as a cooling solvent, and in an intercooler, the water contacts the hot air compressed in the axial compressor and is vaporized, the vaporized steam is stored in a steam tank, and the cooled air is discharged through a nozzle expander.

Here, the weight of the water used as the cooling solvent is about 29 kg (the weight of the cooling water required for the running for 30 minutes), and the volume of the water is about 0.29 m³. When the used water is all vaporized to become steam, the volume increases by 1,244 times to occupy the volume of about 360 m³, and even if the steam is compressed again to reduce the volume to about 207 m³, when considering the total volume of the capsule train vehicle is about 40 m³ to about 100 m³, the volume of the steam tank that stores the steam is still unrealistic and has difficulty in practical application.

Thus, there is a need for a realistic design for the steam tank used for the cooling system of the hypertube transport system.

Next, the background art related to a braking apparatus and method of the train vehicle running in the vacuum tube according to the present invention will be described.

Recently, studies on ultra-high speed vacuum trains which makes the tube close to the vacuum to minimize air resistance, thereby greatly improving the speed have been actively conducted. Particularly, it is being developed with the aim in which a large and long vacuum tunnel (tube) is provided to implement the ultra-high speed vacuum train, and the maglev train runs in the tube so as to run at the highest speed of 9200 km/h.

In this case, since the vehicle runs in the tube in a non-contact state at a very fast speed, it is necessary to prepare a method for effectively braking the vehicle.

Methods for adjusting an area of the vehicle and a rate of the compressor to control air resistance and power generation resistance through a linear motor or for braking the vehicle in reaction to a partial vacuum conductive tube using a magnet (permanent magnets, electromagnets, etc.) attached to the vehicle to be levitated by magnetic force is known as the methods that have been studied up to now.

However, in these methods, the braking force is generated in a local area of the partial vacuum conductor tube that reacts with the magnet for the braking. In order to allow the tube to withstand the braking force, 1) rigidity and 2) a thickness of the tube have to eccentrically increase, and thus, there is a problem of unnecessarily rapidly increasing in manufacturing cost of the tube infrastructure.

Thus, in order to solve this problem, a new concept of the braking system that is capable of evenly distribute the braking force throughout to the conductive tube to perform the braking has been proposed.

In this regard, Korean Patent Registration No. 10-1130807 (Title of Invention: VACUUM SECTIONAL MANAGEMENT SYSTEM AND VACUUM BLOCKING SCREEN DEVICE FOR THE TUBE RAILWAY) discloses a tube railway system in which noise and air resistance are minimized to allow a train to run at an ultra-high speed by using a tube that is in a sealed vacuum state.

Next, the background art related to a superconducting switch for the maglev superconducting electromagnet according to the present invention will be described.

Since a general magnet or semiconductor switch has contact resistance therein, it is difficult to maintain magnetic fields due to sudden attenuation of a superconducting coil due to a loss of resistance during a permanent current mode operation. Therefore, the superconducting switch that is capable of turning on and off by controlling a change in superconductivity according to a temperature of a superconductor in the permanent current mode operation of the superconducting coil is used.

FIG. 15 is a view illustrating a basic structure of a superconducting switch $1c$ according to the related art. The superconducting switch $1c$ has a structure in which a hot wire heater $3c$ capable of generating heat is installed in a thin film type superconducting wire $2c$. Since the thin film type superconducting wire $2c$ is disposed in liquid nitrogen having a temperature of 77 K within a cooling tank, when there is no heat of the heating wire heater $3c$, a superconducting layer $4c$ becomes a superconducting state, and the electrical resistance becomes 0 [Ω]. However, when the heat is applied to the thin film type superconducting wire $2c$ by the hot wire heater $3c$ to rise above a critical temperature, the superconducting phenomenon is broken so as to be changed into an insulating state. Thus, the superconducting properties of the hot wire heater $3c$ is controlled by the heat to realize the electrical on and off operating states.

Meanwhile, the thin film type superconducting wire 1 includes an insulating layer $5c$, a metal conductive layer $6c$, and a substrate $7c$ in addition to the superconducting layer $4c$ to manufacture a product. Therefore, even if the superconducting layer $4c$ is insulated to be turned off, electrical resistance Rpcs is present through the metal conductive layer $6c$. Accordingly, the thin film type superconducting wire 1 serves as discharge resistance for removing current flowing through the superconducting coil so as to release magnetization of the superconducting coil.

In this case, when energy stored in the superconducting coil is large, a value of the electrical resistance Rpcs has to be large for fast discharge. For this, a length of the superconducting wire increases in manufacturing of the superconducting switch to cause a problem in which the switch increases in size.

Furthermore, the superconducting switch $1c$ having such a structure causes a phenomenon in which liquid nitrogen is vaporized because the heat of the heater is easily transferred to the surrounding liquid nitrogen. As a result, there is a problem in stability of the superconducting electromagnet.

Next, the background art related to a vehicle driving stabilization apparatus of the hypertube transport system according to the present invention will be described.

The hypertube transport system is a technology that transports vehicles at a high speed of more than 1,200 km/h by maglev and propulsion in the partial vacuum tube. For example, it is being recently spotlighted as a technology in which resistance of noise and air to the maglev is reduced using the enclosed tube that is in the partial vacuum state as the railway to realize the ultra-high speed transportation.

In the hypertube transport system, it may often occur that the vehicle is impacted by various disturbances such as vibration, electromagnetic force, air resistance and the like in that the vehicle runs in the tube that is in the partial vacuum state and is sealed from a special vehicle running environment, i.e., external atmospheric pressure, in that the vehicle runs by the electromagnetic force interaction between the electromagnetic rail inside the tube and the vehicle-side electromagnet, in that air resistance is generated by high speed running of the vehicle in the tube that is in the partial vacuum state, and the vehicle constituted by a vehicle body and a bogie is used, and the like.

In the hypertube transport system, since the vehicle runs at an ultra-speed of 1,200 km/h or more, even a very small disturbance may cause a large accident, and even if it is not an accident, the disturbance may act as a factor to reduce the comfort of passenger inside the vehicle.

The following describes some cases in which the driving stability of a vehicle is degraded due to disturbance in a special vehicle driving environment of the hypertube transport system.

First, the railway inside the tube is affected if the tube is deformed. If the tube is partially lowered due to the earthquake or ground subsidence, the railway may have a height difference, and tube deformation such as a drooping phenomenon of the tube railway between a girder supporting the tube and a girder may occur. When the height difference is generated due to an installation tolerance at a connection portion between the tube and the tube, an impact is transmitted to the vehicle running on the tube railway to deteriorate the driving stability of the vehicle.

Second, the vehicle is levitated and propelled by the electromagnetic force interaction between the electromagnet of the vehicle and the electromagnetic rail inside the tube. Thus, excessive electromagnetic force from the tube-side electromagnetic rail may be introduced into the vehicle-side electromagnet due to the installation alignment problem of the electromagnetic rail installed inside the tube, for example, misalignment of the electromagnetic rail due to the tube deformation, an alignment error when installing the electromagnetic rail, and the like. As a result, the electromagnetic force may be transmitted to the vehicle to reduce the driving stability of the vehicle. Of course, the non-uniformity in electromagnetic force due to the interaction between the tube-side electromagnetic rail and the vehicle-side electromagnet may be generated to deteriorate the driving stability of the vehicle.

Third, the tube installed on the ground, in the ground, and in the sea, etc., is inevitable to install a curved section by the terrain, features, as well as a straight section in the formation of a vehicle running path. Accordingly, centrifugal force may be generated when the vehicle runs in a curved section at a high speed of 1,200 km/h or more to deteriorate the driving stability of the vehicle.

Fourth, the hypertube transport system may have a mixture of a partial vacuum tube section as a vehicle running path and a tube section changed from the partial vacuum state to the atmospheric pressure state so as to allow passengers to get in or out of the vehicle and to maintain and repair the tube. Thus, the change in air pressure may generate air resistance, or the air resistance and irregular air flow may be generated due to the running flow of the vehicle running inside the tube to deteriorate the driving stability of the vehicle.

Therefore, there is an urgent need for technology development to improve the driving stability of the vehicle by attenuating the impact caused by the various disturbances such as the vibration, the electromagnetic force, and the air resistance generated by a special vehicle driving environment in the hypertube transport system.

Next, the background art related to a vehicle braking apparatus of the hypertube transport system according to the present invention will be described.

The hypertube transport system is a technology that transports vehicles at a high speed of more than 1,200 km/h by maglev and propulsion in the partial vacuum tube. For example, it is being recently spotlighted as a technology in which resistance of noise and air to the maglev is reduced using the enclosed tube that is in the partial vacuum state as the train railway to realize the ultra-high speed transportation.

The hypertube transport system includes a tube that is isolated from the outside to maintain the inside at a low pressure, that is, a vacuum state, a vehicle running inside the tube in the vacuum state, a liner synchronous motor (LSM) constituted by a stator provided at a track side of the tube and a rotor provided in the vehicle to correspond to the tube-side stator to generate propulsion force in a longitudinal direction of the tube, a levitation guide unit that levitates the vehicle by the magnetic force and places the vehicle on a concentric axis within the tube, and a power supply device installed on an upper portion of an inner circumferential surface of the tube and an outer circumferential surface of the vehicle corresponding to the upper portion to supply power to the vehicle.

The hypertube transport system is a ground transport unit, which runs at an ultra-high speed that is close to the speed of sound, such as more than 1,200 km/h, and thus, technologies for decelerating and braking the vehicle are the most important.

That is, the vehicle deceleration and braking have to be performed quickly and accurately in various dangerous situations such as a problem in any device of the vehicle, a risk of collision between vehicles, or damage to the tube track due to the disturbance. Of course, the deceleration and braking have to be done properly for the vehicle arriving at its destination in the hypertube transport system.

In general, the running and deceleration braking of the vehicle may be performed by the maglev and propulsion method in the hypertube transport system. For example, the running and deceleration braking of the vehicle may be performed by using the magnetic force of the linear synchronous motor (LSM) installed in the tube track. In the prior art, there is a problem that the vehicle is braked only in a section of the tube track, in which the linear synchronous motor (LSM) is installed. Furthermore, in order to be able to brake the vehicle in all sections of the tube track, the linear synchronous motor (LSM) has to be installed in all sections of the tube track, resulting in excessive construction costs of the hypertube transport system.

Meanwhile, many countries are currently developing hypertube transport systems, and most of them focus only on research and development on vehicle driving techniques. That is, it only refers to the vehicle braking techniques, for example, the concept of the vehicle braking, such as braking of the vehicle running in the tube, which is in the partial vacuum state, by using sand, and does not provide any specific vehicle braking implementation techniques.

Next, the background art related to a maglev train including the energy harvester according to the present invention and an infrastructure system on which the maglev train runs will be described.

Maglev propulsion refers to propulsion by levitating the train at a certain height from the track by using the electric magnetic force. The maglev train includes a track and a bogie that is levitated and propelled on the track in a non-contact manner.

The maglev train propels the bogie in a state of being spaced apart from the track by applying attractive force or repulsion force by an electromagnet between the bogie and the track. As described above, since the maglev system is propelled in the non-contact state with the track, noise and vibration are low, and the high speed propulsion is possible.

The maglev train is provided with a magnet for the levitation and is classified into an attraction type using attractive force of the magnet and repulsion type using repulsive force of the magnet. Also, the maglev magnet includes a superconducting electromagnet, a phase conducting electromagnet, and a permanent magnet.

The main force components of the maglev train includes levitation force, propulsion force, and guiding force. Here, the levitation force is in charge of the levitation magnet, the propulsion force is generated by an electromagnet, a permanent magnet, or a conductive plate according to the type of linear synchronous motor, and the guiding force is in charge of the guiding magnet.

In order to supply power to the maglev train, a power supply including a large-capacity battery is installed, and the power supply has to be stably controlled to stably generate the levitation force, the guiding force, and the propulsion force.

In recent years, development of a hypertube type train is in progress, which allows the maglev train to run in the tube type tunnel that is maintained in the partial vacuum state by using utilizing such a maglev train.

In this regard, Korean Patent Publication No. 10-2016-0103862 (Title of Invention: MAGNETIC LEVITATION TRAIN HAVING CONTROLLER) discloses a magnetic levitation train moving by being levitated by magnetic force.

Since the maglev train operates in a non-contact manner, a large amount of vibration is generated in a vertical direction or in left and right directions while the vehicle runs, and thus it is difficult to provide an effective unit for reducing such the vibration.

Also, since various types of energy including the magnetic fields generated in the vehicle are supplied to the ground apparatus installed around the maglev train, it is necessary to recycle such energy sources, thereby improving energy utilization efficiency.

DISCLOSURE OF THE INVENTION

Technical Problem

A technical object of the present invention, which is related to a refrigerant for cooling compressed air in a hypertube transport system and a compressed air cooling system using the same, is to provide a refrigerant for compressed air in a hypertube train, which is used as a refrigerant by mixing propanediol and ethylene glycol with a mixture of slush ice and water, but does not cool the compressed air by using a cooling water, and a compressed air cooling system using the same.

A technical object of the present invention, which is related to a braking apparatus and method of a train vehicle that runs in a vacuum tube, is to provide an apparatus that is capable of effectively providing braking force to a train vehicle running in a vacuum tube.

A technical object of the present invention, which is related to a superconducting switch for a maglev superconducting electromagnet, is to provide a superconducting switch for a maglev superconducting electromagnet which is capable of easily and stably performing a turn on-off operation of current when compared to the superconducting switch according to the related art and capable of improving a charging/discharging rate of current with respect to a superconducting coil during a permanent current mode operation.

A technical object of the present invention, which is related to a vehicle driving stabilization apparatus of a hypertube transport system, is to provide a vehicle driving stabilization device of a hypertube transport system, in which an elastic plate, a passive suspension, an active suspension, an electromagnetic force damper, and an aerodynamic adjustment vane are selectively installed in a vehicle running in a tube that is in a partial vacuum state to reduce an impact caused by various disturbances such as vibration, electromagnetic force, air resistance, an irregular air flow, and the like, which are caused by special vehicle driving environments, thereby improving driving stability of the vehicle.

A technical object of the present invention, which is related to a vehicle braking device of a hypertube transport system, is to provide a vehicle braking device of a hypertube transport system, in which a compressor opening/closing vane, a flow gap blocking vane, and a moisture expansion material are selectively installed at a front head-side of a vehicle running in a tube that is in a partial vacuum state to block a flow of air passing through the front head-side of the vehicle or block a flow of air passing through a gap between the vehicle and the tube, thereby braking the vehicle.

A technical object of the present invention, which is related to a maglev train including an energy harvester and an infrastructure system on which the maglev train runs, is to provide a maglev train including an energy harvester, in which the energy harvester for collecting various energy sources to produce power is disposed in the maglev train or the infrastructure system to improve driving stability of the train as well as the production of the power, and an infrastructure system on which the maglev train runs.

Technical Solution

In a refrigerant for cooling compressed air of a hypertube transport system and a compressed air cooling system using the same according to the present invention, the refrigerant for cooling the compressed air of the hypertube transport system is a mixture in which a mixture of propanediol ($C_3H_8O_2$) and ethylene glycol ($C_2H_6O_2$) is mixed with slush in which ice and water are mixed.

Here, the slush in which ice and water are mixed may be a mixture of ice and water at a weight ratio of 85:15.

Also, the slush, in which ice and water are mixed, and a mixture of propanediol ($C_3H_8O_2$) and ethylene glycol ($C_2H_6O_2$) may be mixed at a weight ratio of 1:9.

Furthermore, the mixture of propanediol ($C_3H_8O_2$) and ethylene glycol ($C_2H_6O_2$) is composed of 90% to 70% by weight of propanediol ($C_3H_8O_2$) and 10% to 30% by weight of ethylene glycol ($C_2H_6O_2$).

Also, in a refrigerant for cooling compressed air of a hypertube transport system and a compressed air cooling system using the same according to the present invention, a compressed air cooling system of the hypertube transport system includes a slush reservoir configured to store a cooling solvent in which propanediol ($C_3H_8O_2$) and ethylene glycol ($C_2H_6O_2$) are mixed in slush in which ice and water are mixed and an intercooler configured to cool the cooling solvent of the slush reservoir by contacting the air compressed in a compressor.

Here, the slush in which ice and water are mixed may be a mixture of ice and water at a weight ratio of 85:15.

Also, the slush, in which ice and water are mixed, and a mixture of propanediol ($C_3H_8O_2$) and ethylene glycol ($C_2H_6O_2$) may be mixed at a weight ratio of 1:9.

Furthermore, the mixture of propanediol ($C_3H_8O_2$) and ethylene glycol ($C_2H_6O_2$) is composed of 90% to 70% by weight of propanediol ($C_3H_8O_2$) and 10% to 30% by weight of ethylene glycol ($C_2H_6O_2$).

In a braking apparatus and method of a train vehicle running in a vacuum tube according to the present invention, the tube running train vehicle that runs in the conductive tube includes a first electromagnet disposed at a front head of the vehicle, a second electromagnet disposed at a rear tail of the vehicle, and a power supply configured to supply power to the first electromagnet and the second electromagnet, wherein the power supply supplies current to the first electromagnet and the second electromagnet in response to a braking signal of the vehicle to magnetize the front head of the vehicle with a first polarity and magnetize the rear tail of the vehicle with a second polarity.

In a braking apparatus and method of a train vehicle running in a vacuum tube according to the present invention, the braking method of the train vehicle running in the vacuum tube includes: (a) receiving speed and magnetic field information of a vehicle through a motion sensor and a magnetic field sensor by a running controller; (b) adjusting current flowing through a first electromagnet and a second electromagnet by a power supply based on speed and magnetic field information of the vehicle, which are received by the running controller; (c) magnetizing a vehicle front heat with a first polarity and magnetizing a vehicle rear tail with a second polarity through the current received through the power supply by using the first electromagnet and the second electromagnet; and (d) allowing the vehicle to obtain braking force and start deceleration so as to stop.

A superconducting switch for a maglev superconducting electromagnet is provided in the superconducting electromagnet to perform switching into a charging mode and a permanent current mode, wherein the superconducting switch includes a case, a superconducting wire wound in the case, a bobbin formed at a central portion of the case to allow the superconducting wire to be wound, and a heater installed in a central space of the bobbin to generate heat when current is applied from the outside.

In an embodiment, the bobbin may be made of a conductive material to transfer heat generated from the heater to the superconducting wire.

In an embodiment, the case may include a bottom part having a circular plate shape and a sidewall part formed at a predetermined height from the bottom part and may include a main body of which an upper portion is opened to accommodate the bobbin, the superconducting wire, and the heater and a cover part configured to cover a portion of the upper portion of the main body.

In an embodiment, the superconducting wire may be wound on an area overlapping the cover part and may be in non-contact with an external cooling medium by the cover part.

In an embodiment, the bobbin may have a diameter less than that of the bottom part, a predetermined interval may be defined from the sidewall part to the bobbin, and the superconducting wire may be wound in the winding space in which the interval is defined.

In an embodiment, the superconducting wire may include a pair of first and second wire units overlapping each other, and the first and second wire units may be wound several times in the winding space.

In an embodiment, the first and second wire units may be one extending wire.

In an embodiment, the pair of overlapping first and second wire units may extend in a shape of which ends connected to each other are rounded so that the ends are spaced from each other, and each end may extend from each other to be adjacent to overlap each other up to both ends thereof.

In an embodiment, one end of the first wire unit may be formed in a central space of the bobbin, and one end of the second wire unit may be formed in a winding space so as to be wound along an outer surface of the bobbin.

In an embodiment, the bobbin may include a first through-hole through which the ends of the first and second wire units connected to each other pass, a second through-hole through which one end of the first wire unit extends, and a third through-hole through which both ends of the first and second wire units pass.

In an embodiment, the heater may include a first heater disposed in a first space of the central space and a second heater disposed in a second space of the central space, wherein the first and second heaters may be symmetrical to each other with respect to the one end of the first wire unit.

In an embodiment, the first and second wire units may be insulated from each other by being covered with an insulator on entire outer circumferential surfaces thereof and may be insulated from the bobbin.

In a vehicle driving stabilization apparatus of a hypertube transport system according to the present invention, the vehicle driving stabilization apparatus of the hypertube transport system includes a sealing part having an internal space that is isolated from an external atmospheric pressure side and a vehicle constituted by a vehicle body and a bogie to run in the sealing part, wherein an electromagnet is provided in the bogie of the vehicle, and an electromagnetic rail is provided on an inner wall of the sealing part so that the vehicle runs by electromagnetic force between the vehicle bogie-side electromagnet and the sealing part inner wall-side electromagnetic rail, the vehicle driving stabilization apparatus comprises a disturbance impact attenuator provided at a side of the vehicle to attenuate a disturbance impact caused by vibration, electromagnetic force, air resistance, or an irregular air flow, which is generated when the vehicle runs in the sealing part that is in a partial vacuum state, and the disturbance impact attenuator prevents the disturbance impact, which is caused by the vibration, the electromagnetic force, the air resistance, or the irregular air flow, from being transmitted from the bogie side of the vehicle toward the vehicle body side.

In a vehicle braking apparatus of a hypertube transport system according to the present invention, the vehicle braking apparatus of the hypertube transport system includes a tube having an internal space that is sealed from an external atmospheric pressure side, a vehicle configured to run in the tube, an air flow blocking part installed at a vehicle side to block an air flow passing through a vehicle front head-side or block an air flow passing through a gap between the vehicle and the tube, wherein vehicle deceleration and braking are performed by a control operation of the air flow blocking part.

In a maglev train comprising an energy harvester and an infrastructure on which the maglev train runs according to the present invention, the maglev train including the energy harvester includes: a main body of the train; an electromagnet disposed on each of left and right surfaces of the main body along a direction in which the maglev train runs; and one or more energy harvesters disposed in the main body to generate power based on vibration of the main body, wherein each of the energy harvesters includes: a first power generation module configured to convert vibration generated along the running direction of the main body into electrical energy; a second power generation module configured to convert vibration generated along a direction of guiding force acting on the main body into electrical energy; and a third power generation module configured to convert vibration generated along a direction of levitation force acting on the main body into electrical energy.

Also, in a maglev train comprising an energy harvester and an infrastructure on which the maglev train runs according to the present invention, the infrastructure system on which the maglev train including the energy harvester runs includes at least one levitation coil installed on each side surface of the maglev train along a running path, an energy storage device configured to store electrical energy induced in the levitation coil, and a controller configured to control an operation of each of the levitation coil and the energy storage device, wherein the controller controls induced electromotive force generated as the maglev train passes through the levitation coil so as to be stored in the energy storage device.

Advantageous Effects

In the refrigerant for cooling the compressed air of the hypertube transport system and the compressed air cooling system using the same, the refrigerant in which the slush, in which ice and water are mixed, and propanediol ($C_3H_6O_2$) and ethylene glycol ($C_2H_6O_2$) are mixed may be used in the cooling system applied to the hypertube train and the subsonic capsule tube so as to be linked with the compressor to reduce the volume required for the cooling by more than 92 times, thereby being applicable to the practical cooling system.

Particularly, In the refrigerant for cooling the compressed air of the hypertube transport system and the compressed air cooling system using the same, it is advantageous because propanediol ($C_3H_8O_2$) and ethylene glycol ($C_2H_6O_2$) are mixed at a certain weight ratio with the slush in which ice and water are mixed so that the freezing point is more lowered to −100° C. or less to more reduce the volume of the cooling system as a whole, and the boiling point is defined to 200° C. or more so that it does not have to worry about gasification.

Also, when explaining the effects of the braking apparatus and method of the train vehicle running the vacuum tube according to the present invention, the tube running train vehicle proposed in the present invention may efficiently provide the braking force to the train vehicle through the relatively simple structure, thereby significantly improving the driving stability of the vehicle. In particular, the non-contact high speed vehicle may be expected to provide the strong braking force at the relatively low cost.

Also, the effect of the superconducting switch for the magnetic levitation superconducting electromagnet according to the present invention will be described.

According to the embodiments of the present invention, since the first and second wire units are stacked and wound several times in the winding space, the first and second wire units may extend relatively lengthily, and thus, it may be possible to implement the superconducting wire extending relatively lengthily in the space of the volume, thereby manufacturing the superconducting switch having the large resistance (Rpcs).

Particularly, when the energy stored in the superconducting coil of the superconducting magnet is large in operating in the permanent current mode, the discharge rate may increase, which is advantageous to apply to the large-capacity maglev superconducting electromagnet.

Also, since the heater and the bobbin are installed inside the case and are covered by the cover part, the heater and the bobbin may not directly contact the external liquid nitrogen to prevent the bubble phenomenon of the liquid nitrogen from occurring by the superconducting switch, thereby improving the driving stability.

Also, since each of the first and second wire units is insulated through the insulating tape, the first and second wire units may be electrically insulated from each other even if overlapping each other and may be insulated from the bobbin. As described above, when heat is applied as the first and second wire units are insulated from each other to generate the resistance, the resistance between the first and second wire units may decrease due to the electrical connection between the first and second wire units, and the switching function of the superconducting wire by the resistance may be faithfully performed.

Furthermore, as the first and second wire units are formed so that each of both the ends of the first and second wire units, which are connected to each other, extend in the rounded shape, when the first and second wire units extend to contact each other, the damage or short circuit of the first and second wire units due to the bending at the connection portion therebetween may be prevented.

Also, the effects of the vehicle driving stabilization apparatus of the hypertube transport system of the present invention will be described.

Therefore, there may be an urgent need for the technology development to improve the driving stability of the vehicle by attenuating the impact caused by the various disturbances such as the vibration, the electromagnetic force, and the air resistance generated by the special vehicle driving environment in the hypertube transport system.

Also, the present invention may cope with the impact of the various disturbances to improve the ride comfort of the passengers in the vehicle and previously prevent the accident of the hypertube transport system.

Also, the effects of the vehicle braking apparatus of the hypertube transport system of the present invention are as follows.

The present invention may propose the vehicle front head-side air flow blocking technique that is optimized for the partial vacuum tube environment to perform the vehicle braking. Thus, there may be the effect of quickly and accurately decelerating and braking the vehicle under the situations such as the braking under the normal operating conditions such as arriving at the destination in the hypertube transport system and the emergency braking in response to the various dangerous situations such as the problems in any device of the vehicle, the risk of the collision between the vehicles, or the damage of the tube track due to the disturbance.

Also, the present invention may have the effect of reducing the construction cost of the hypertube transport system because the vehicle is decelerated and braked in all sections of the tube track in which the linear synchronous motor (LSM) is not installed.

Also, in the maglev train including the energy harvester according to the present invention and the infrastructure system on which the maglev train runs, the energy harvester that generates the power by collecting the various energy sources in the maglev train or its infrastructure system, thereby improving the driving stability of the maglev train as well as the production of the power. Therefore, the energy to be wasted in the maglev train or hypertube system may be recycled.

BRIEF DESCRIPTION OF THE DRAWINGS

The drawings related to a refrigerant for cooling compressed air in a hypertube transport system and a compressed air cooling system using the same are as follows.

The drawings related to a braking apparatus and method of the train vehicle running in the vacuum tube according to the present invention are as follows.

Figure 9:
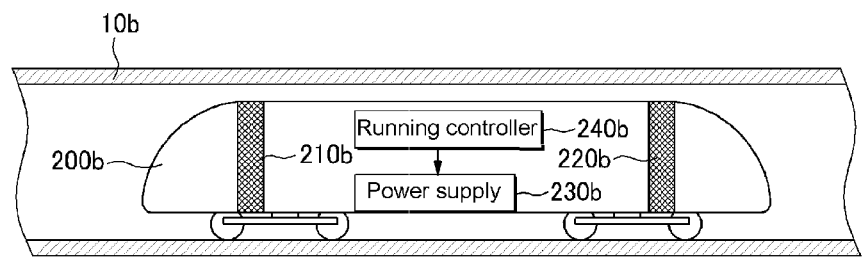

FIG. 9 is a view illustrating an electromagnet disposed in a train vehicle running in a vacuum tube and devices for controlling the electromagnet according to an embodiment of the present invention.

Figure 10:
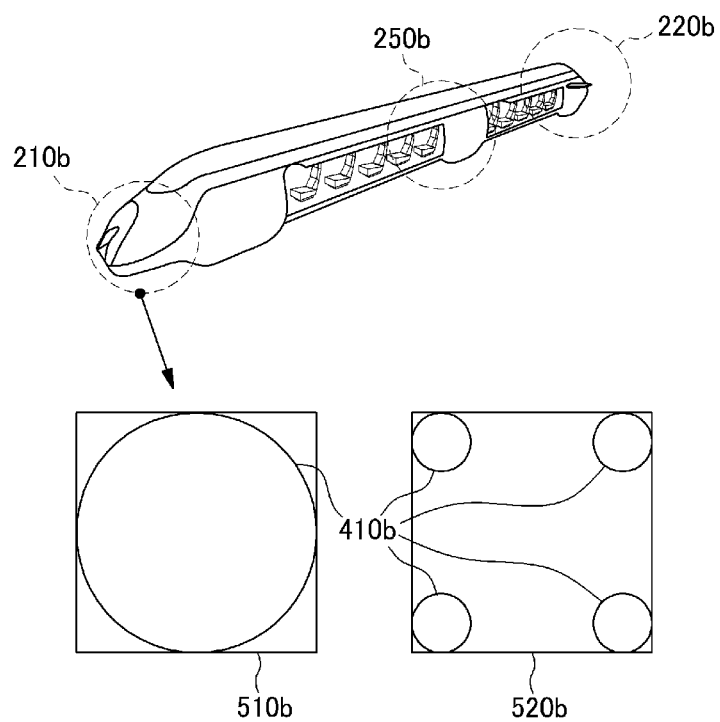

FIG. 10 is an exemplary view illustrating a shape of the electromagnet disposed in the train vehicle running in the vacuum tube according to an embodiment of the present invention.

Figure 11:
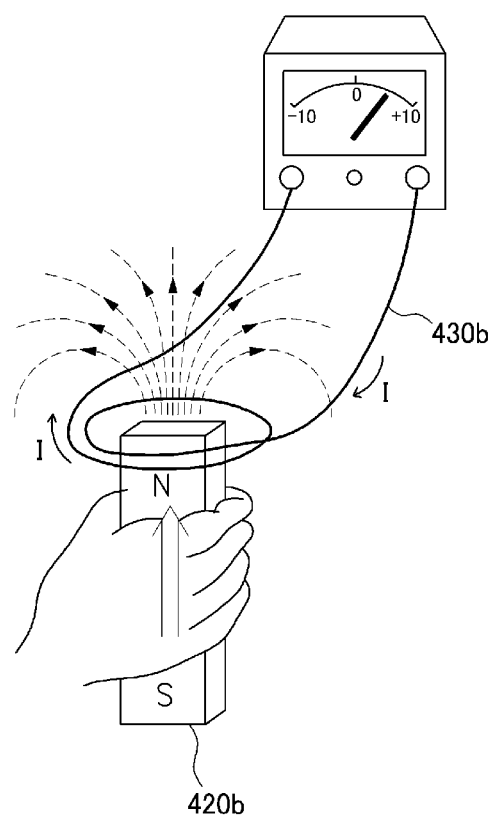

FIG. 11 is an exemplary view for explaining a braking principle of the train vehicle running in the vacuum tube according to an embodiment of the present invention.

Figure 12:
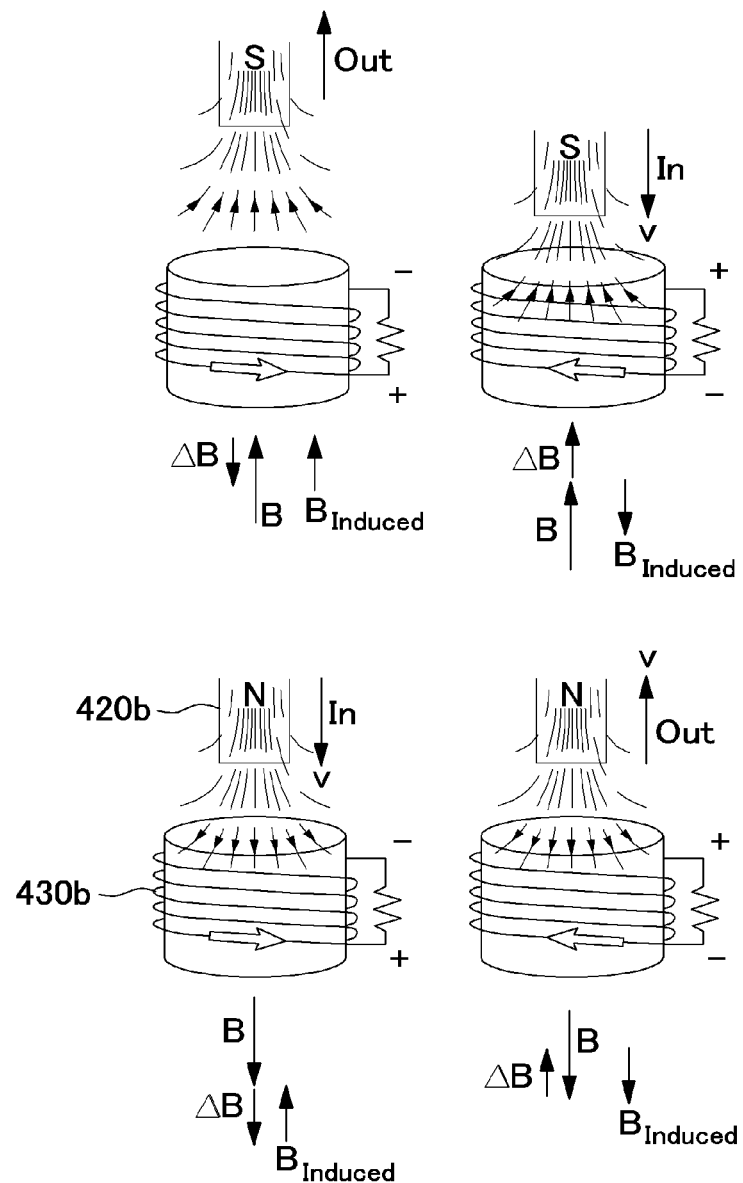

FIG. 12 is an exemplary view for explaining a braking principle of the train vehicle running in the vacuum tube according to an embodiment of the present invention.

Figure 13:
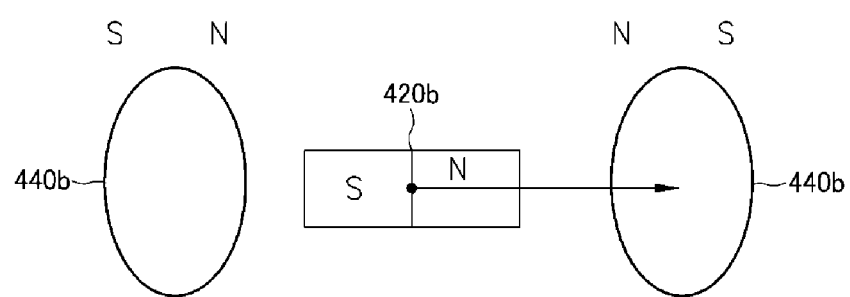

FIG. 13 is an exemplary view for explaining a braking principle of the train vehicle running in the vacuum tube according to an embodiment of the present invention.

Figure 14:
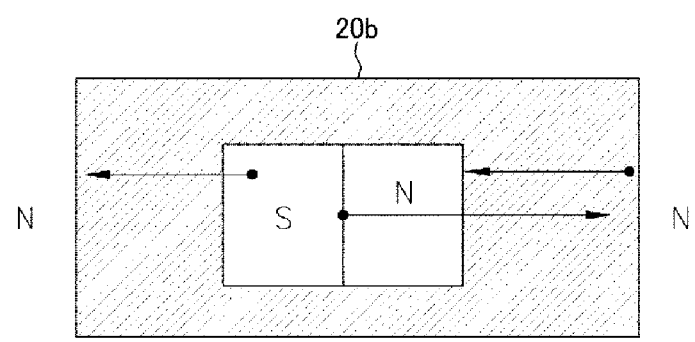

FIG. 14 is an exemplary view for explaining a braking principle of the train vehicle running in the vacuum tube according to an embodiment of the present invention.

The drawings related to a superconducting switch for a maglev superconducting electromagnet according to the present invention are as follows.

Figure 15:
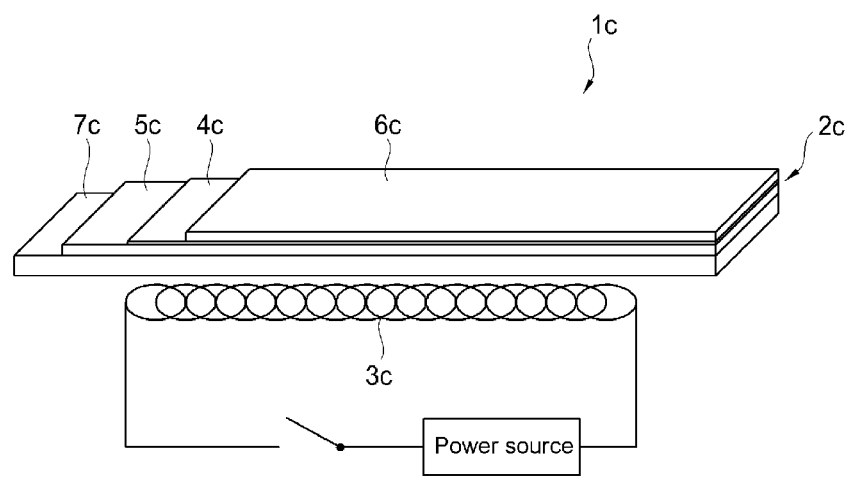

FIG. 15 is a view illustrating a basic structure of a superconducting switch according to the related art.

Figure 16:
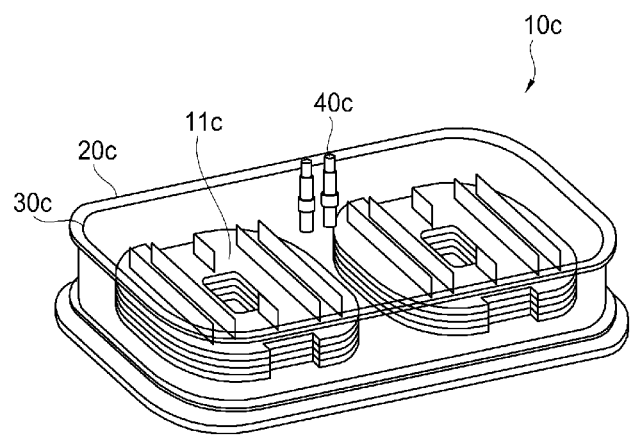

FIG. 16 is a perspective view of a maglev superconducting electromagnet provided with the superconducting switch according to an embodiment of the present invention.

Figure 17A:
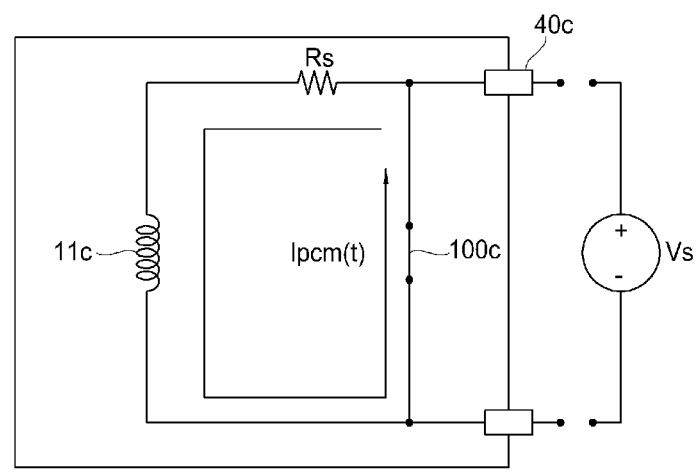
Figure 17B:
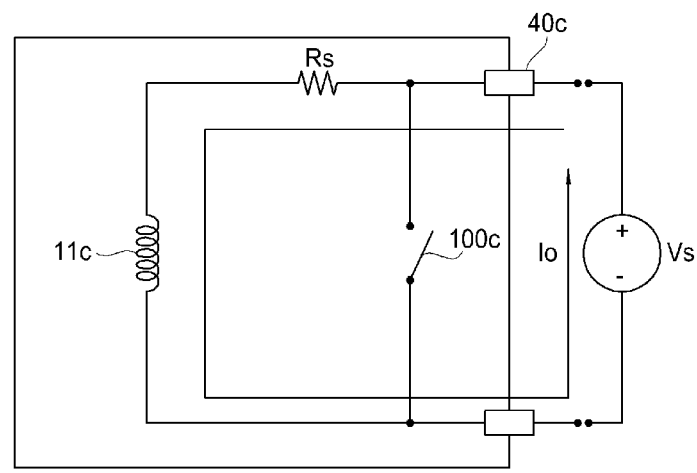

FIGS. 17a and 17b are equivalent circuit diagrams illustrating a state in which a superconducting coil of the superconducting electromagnet of FIG. 16 operates in a permanent current mode and a charging mode.

Figure 18:
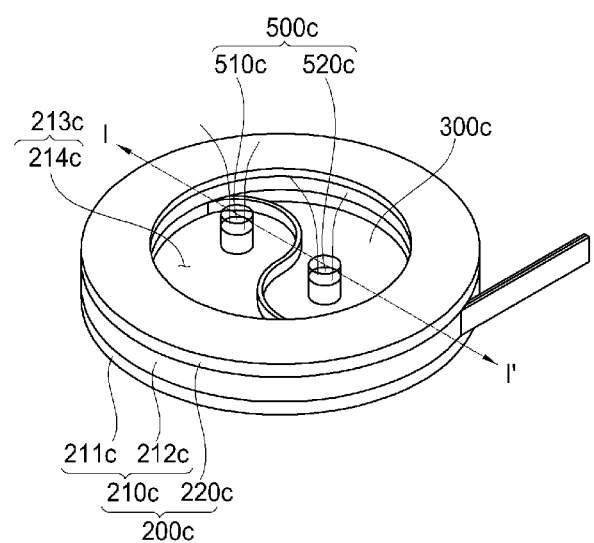

FIG. 18 is a perspective view illustrating a superconducting switch to which the maglev superconducting electromagnet of FIG. 16 is applied.

Figure 19:
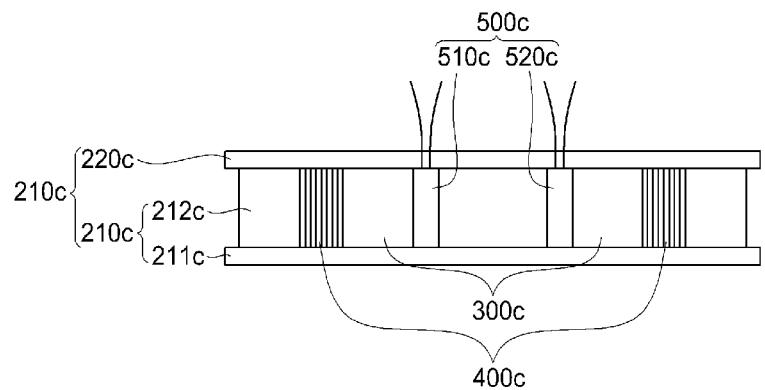

FIG. 19 is a cross-sectional view of the superconducting switch, taken along line I-I' of FIG. 18.

Figure 20:
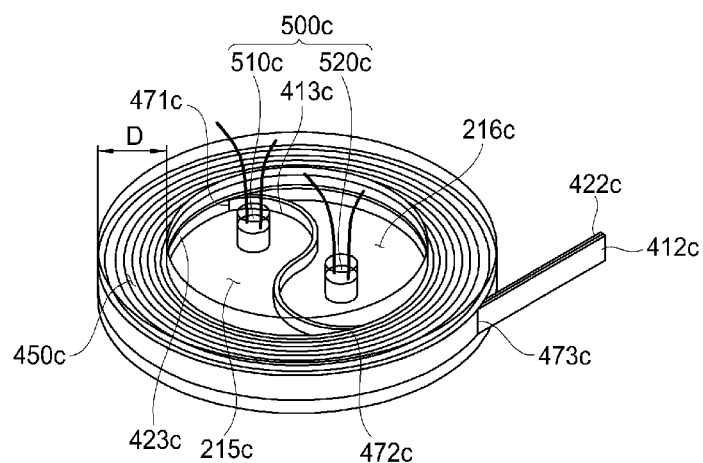

FIG. 20 is an internal configuration diagram of the superconducting switch of FIG. 18.

Figure 21:
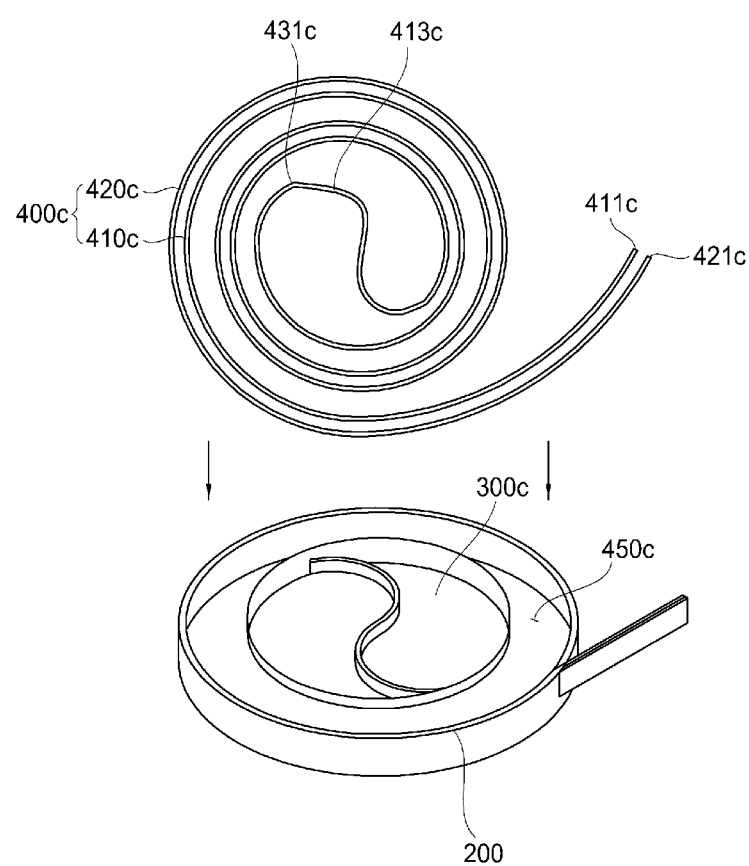

FIG. 21 is a schematic view illustrating a state in which a superconducting wire of the superconducting switch of FIG. 18 is wound.

The drawings related to a vehicle driving stabilization apparatus of the hypertube transport system according to the present invention are as follows.

Figure 22:
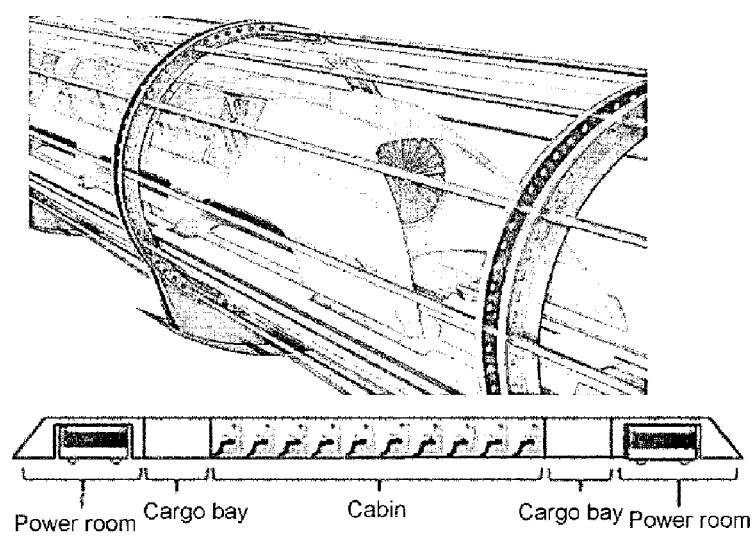

FIG. 22 is an explanatory diagram illustrating the hypertube transport system to which the present invention is applied.

Figure 23A:
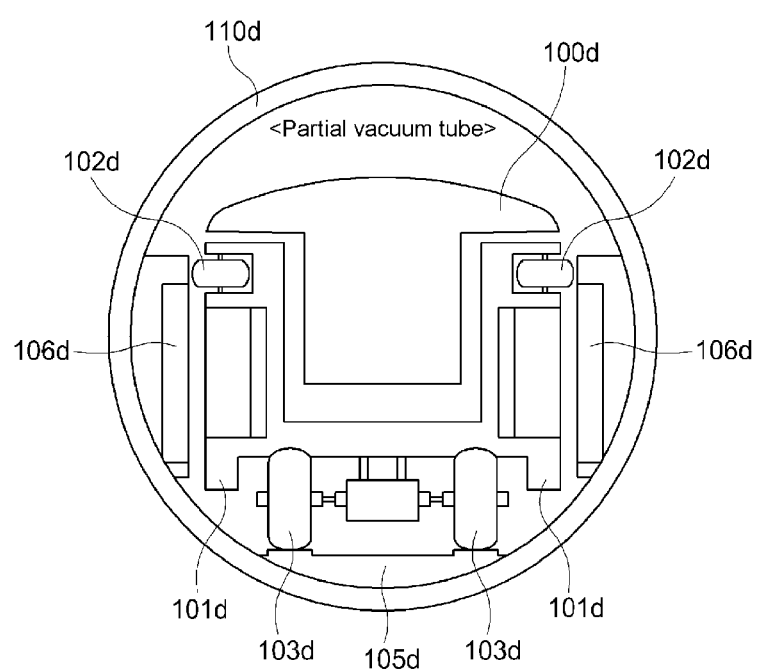
Figure 23B:
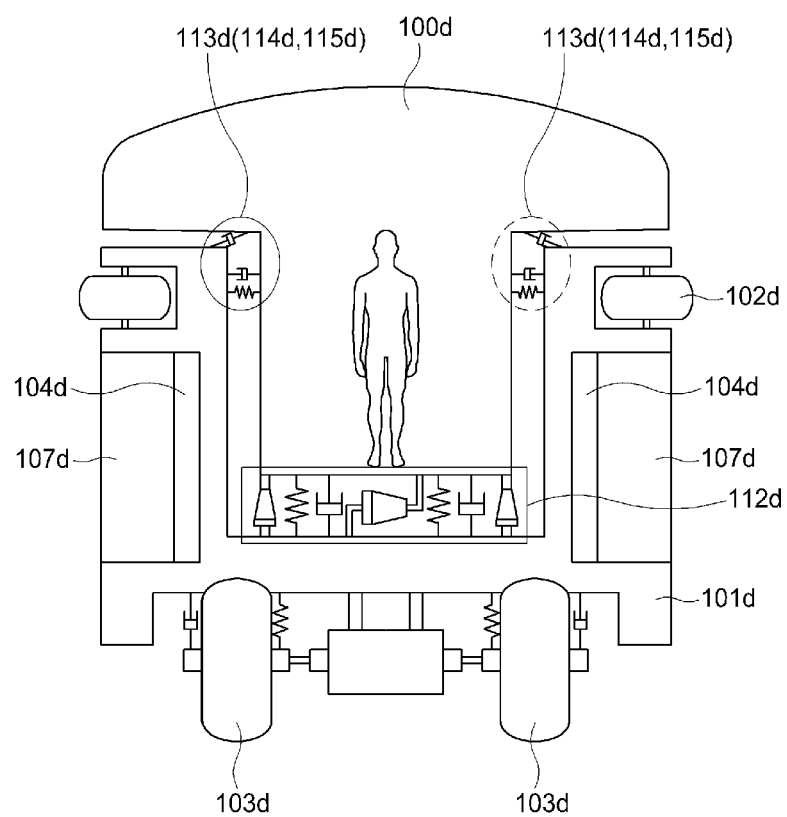

FIGS. 23a and 23b are configuration diagrams of a vehicle driving stabilization apparatus according to a first example of the present invention.

Figure 24:
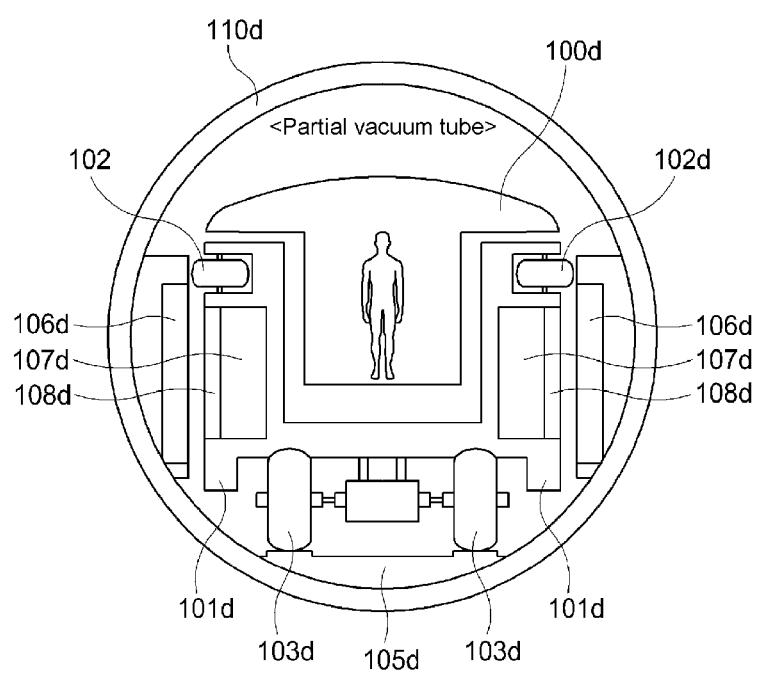

FIG. 24 is a configuration diagrams of a vehicle driving stabilization apparatus according to a second example of the present invention.

Figure 25:
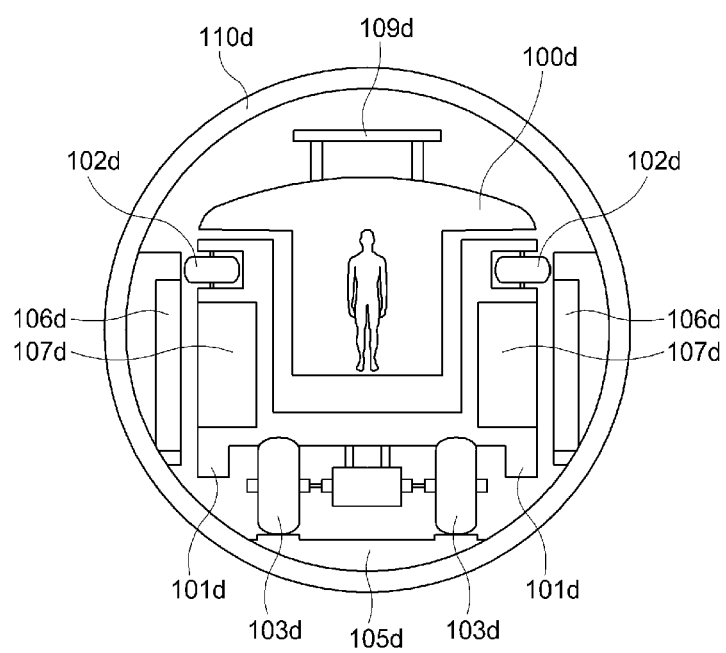

FIG. 25 is a configuration diagrams of a vehicle driving stabilization apparatus according to a third example of the present invention.

The drawings related to a vehicle braking apparatus of the hypertube transport system according to the present invention are as follows.

Figure 26A:
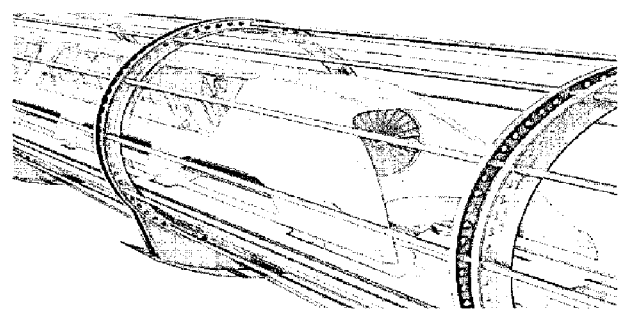

FIG. 26a is an explanatory diagram illustrating the hypertube transport system to which the present invention is applied.

Figure 26B:
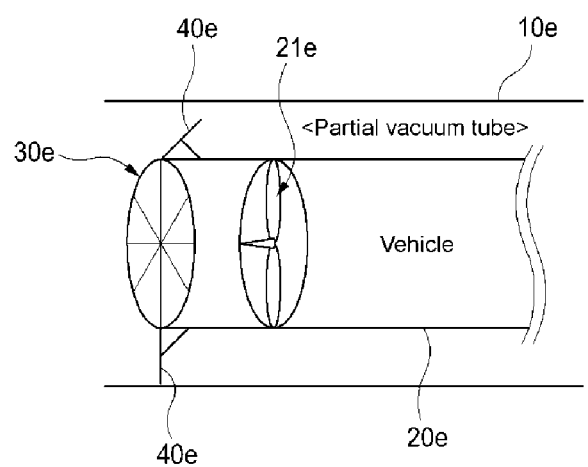

FIG. 26b is a configuration diagram illustrating a vehicle braking apparatus of a hypertube transport system according to a first example of the present invention.

Figure 27A:
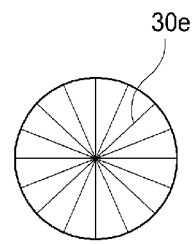
Figure 27B:
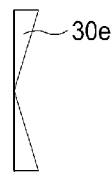
Figure 27C:
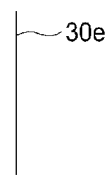

FIGS. 27a to 27c are perspective views of a compressor opening/closing vane of FIG. 26b.

Figure 28:
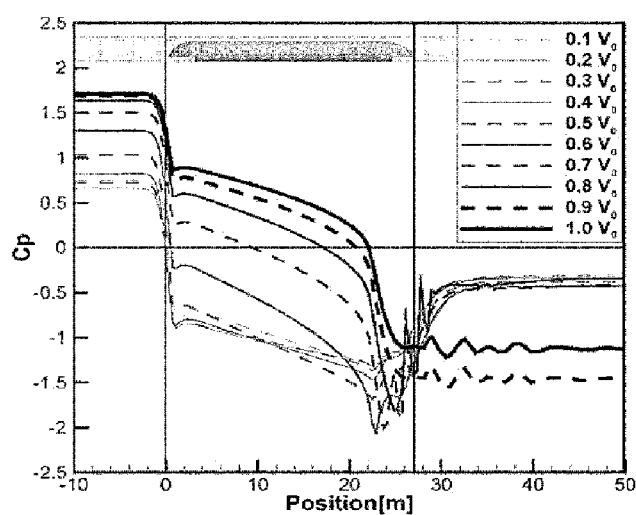

FIG. 28 is a graph illustrating vehicle braking performance when the compressor opening/closing vane of FIG. 26b is used.

Figure 29:
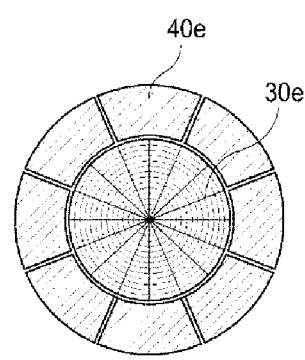

FIG. 29 is a perspective view of a flow gap blocking vane of FIG. 26b.

Figure 30:
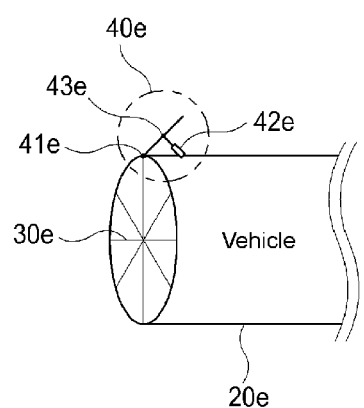

FIG. 30 is an explanatory view illustrating an operation of the flow gap blocking vane of FIG. 26b.

Figure 31A:
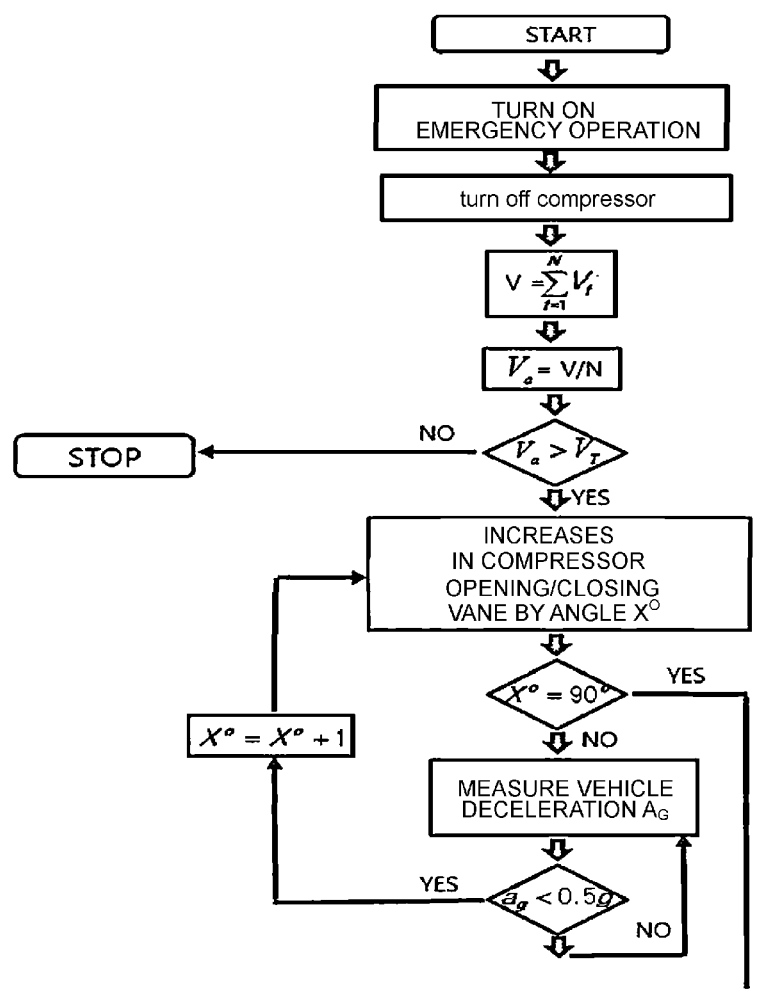
Figure 31B:
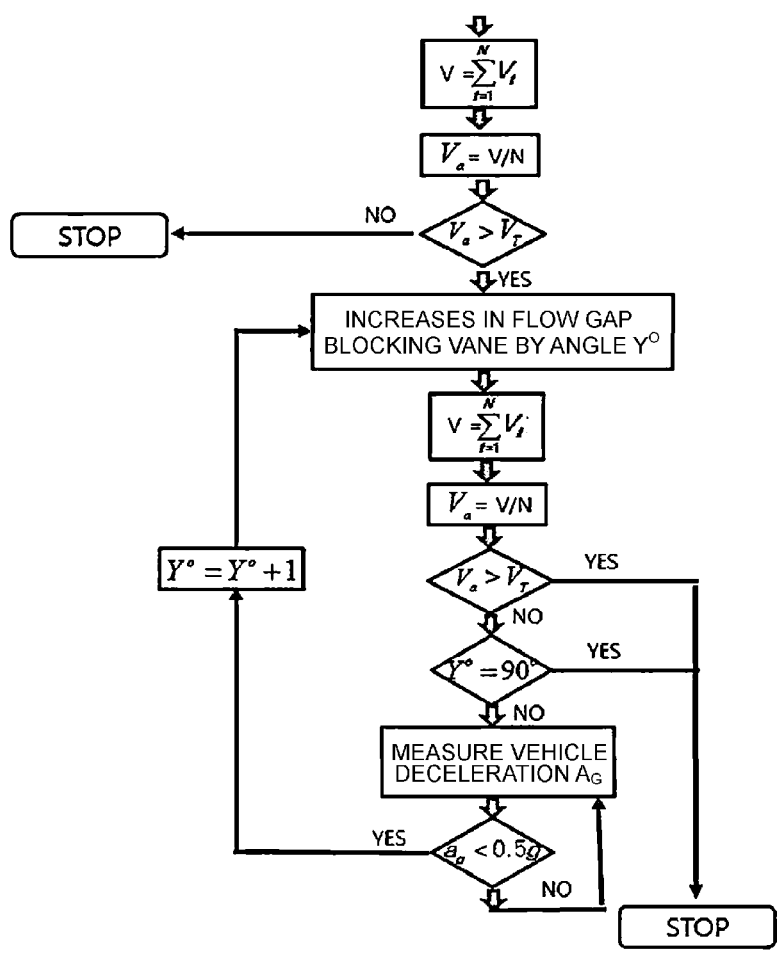

FIGS. 31a and 31b are explanatory view illustrating an operation control algorithm of a vehicle braking apparatus according to a first example of the present invention.

Figure 32:
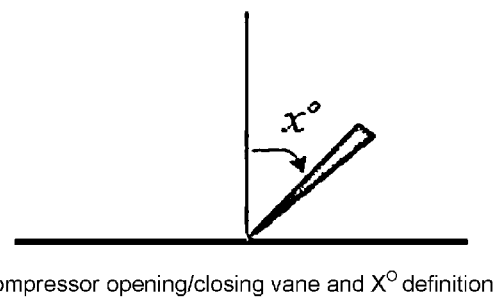
Figure 32:
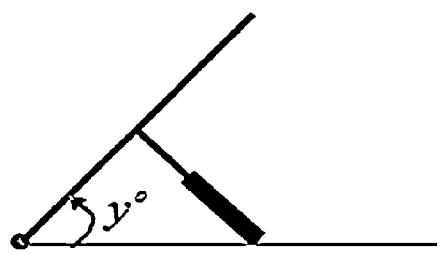

FIG. 32 is an explanatory view illustrating an angle of a compressor opening/closing vane and an angle of a flow gap blocking vane according to the first example of the present invention.

FIGS. 33a, 33b, 34a, and 34b are configuration diagrams illustrating a vehicle braking apparatus of a hypertube transport system according to a second example of the present invention.

Figure 35:
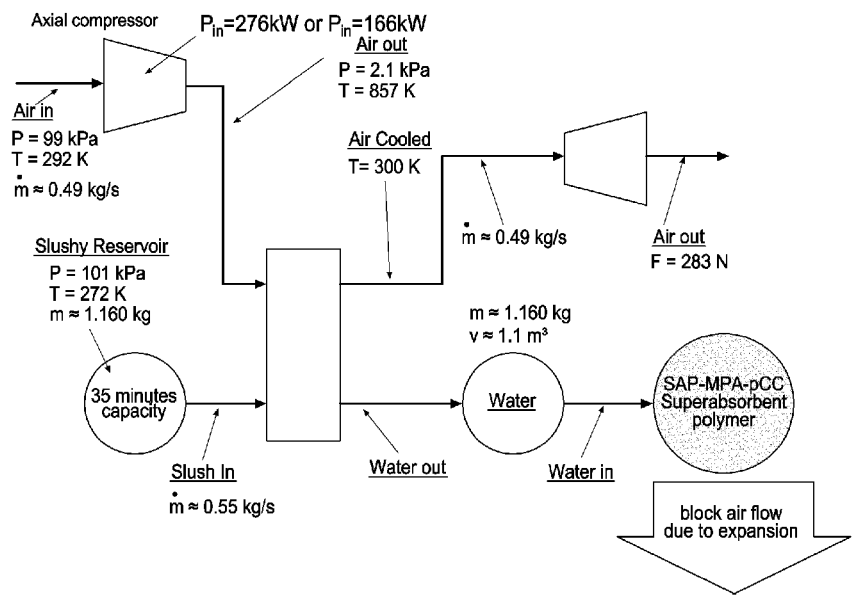

FIG. 35 is an explanatory view illustrating a water supply device for a moisture expansion material according to the second example of the present invention.

FIGS. 36a to 36e are explanatory views illustrating the moisture expansion material according to the second example of the present invention.

The drawings related to a maglev train including the energy harvester according to the present invention and an infrastructure system on which the maglev train runs are as follows.

Figure 37:
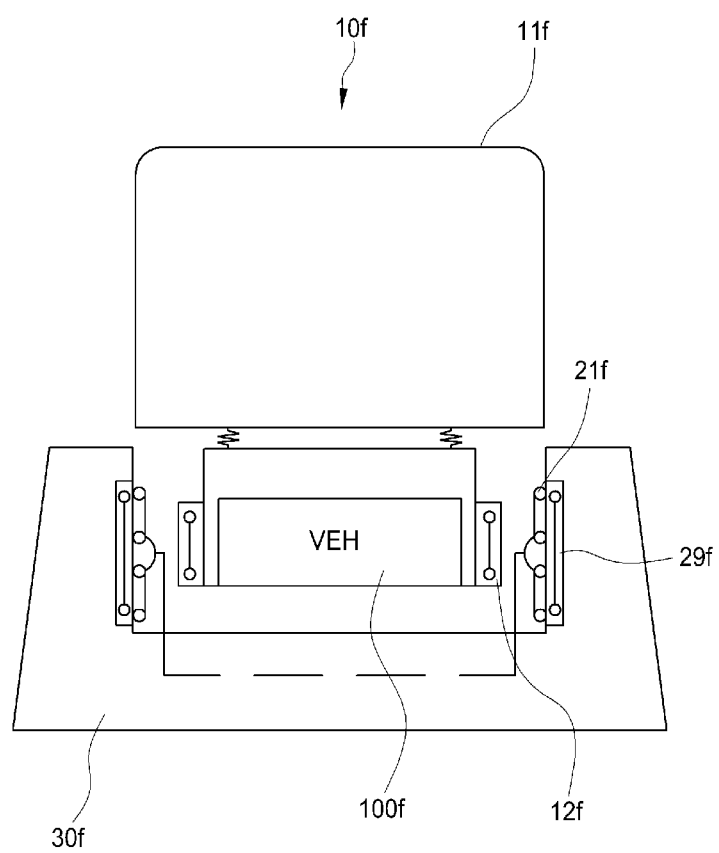

FIG. 37 is a schematic view of a maglev train including an energy harvester according to an embodiment of the present invention.

Figure 38:
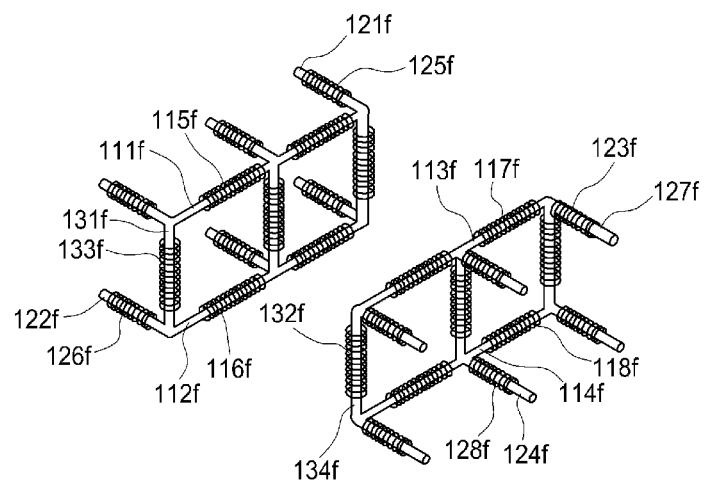

FIG. 38 is a view for explaining the energy harvester according to an embodiment of the present invention.

Figure 39:
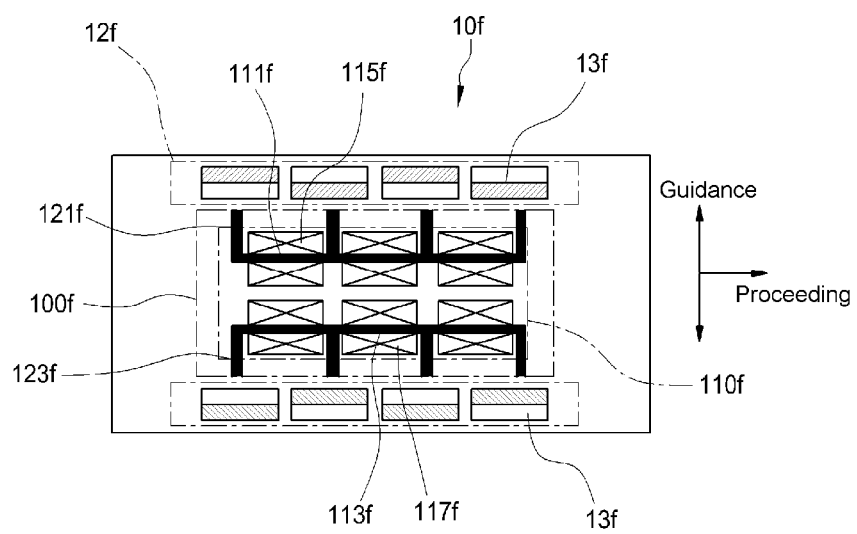

FIG. 39 is a view for explaining a first power generation module according to an embodiment of the present invention.

Figure 40:
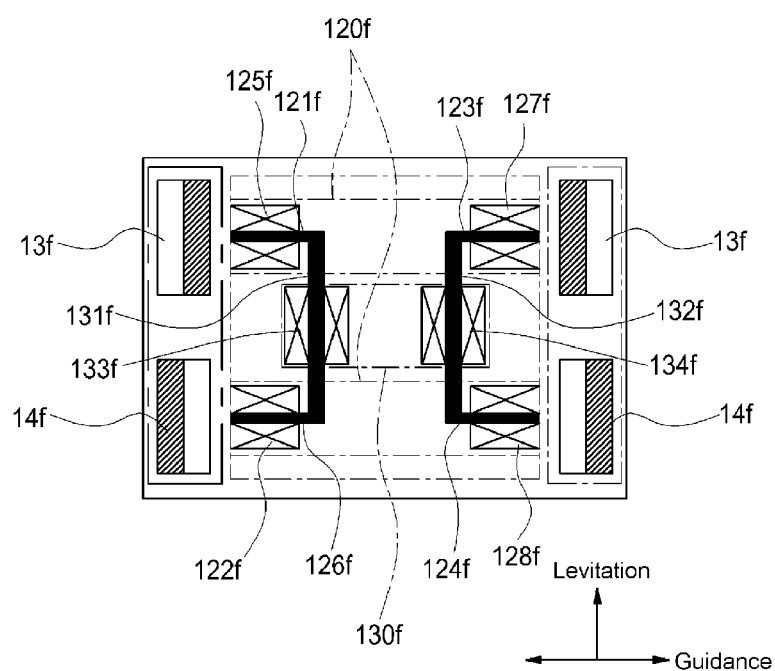

FIG. 40 is a view for explaining a second power generation module and a third power generation module according to an embodiment of the present invention.

Figure 41:
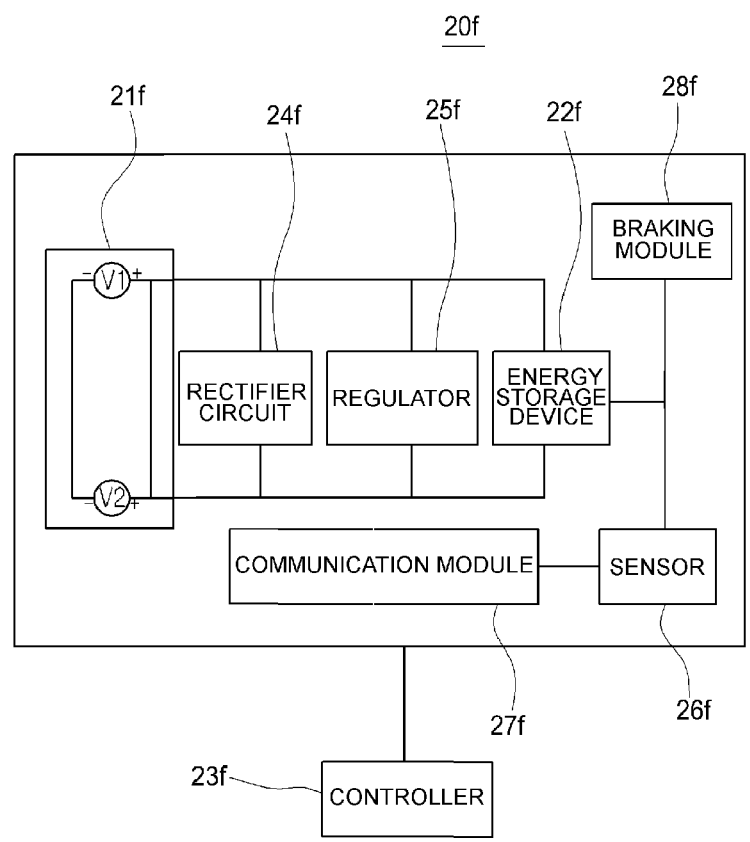

FIG. 41 is a view for explaining an infrastructure system according to an embodiment of the present invention.

MODE FOR CARRYING OUT THE INVENTION

Terms or words used in the specification and claims should not be construed as limited to a lexical meaning, and should be understood as appropriate notions by the inventor based on that he/she is able to define terms to describe his/her invention in the best way to be seen by others.

Therefore, the embodiments described in this specification and the constructions illustrated in the drawings are only preferred embodiments of the present invention, and may not describe the technical spirit thoroughly. Accordingly, it should be understood that various equivalents and modifications which can substitute the embodiments may be provided at a point of application time of this specification.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements. In this specification below, when one part is referred to as being "connected" to another part, it should be understood that the former can be "directly connected" to the latter, or "electrically connected" to the latter via an intervening member. Furthermore, when it is described that one comprises (or includes or has) some elements, it should be understood that it may comprise (or include or has) only those elements, or it may comprise (or include or have) other elements as well as those elements if there is no specific limitation.

Since the present invention may have diverse modified embodiments, specific embodiments are illustrated in the drawings and are described in the detailed description of the inventive concept. However, this does not limit the present invention within specific embodiments and it should be understood that the present invention covers all the modifications, equivalents, and replacements within the idea and technical scope of the inventive concept. Like reference numerals refer to like elements throughout. It will be understood that although the terms such as 'first' and 'second' are used herein to describe various elements, these elements should not be limited by these terms.

The terms are only used to distinguish one component from other components. In the following description, the technical terms are used only for explaining a specific exemplary embodiment while not limiting the present invention. The terms of a singular form may include plural forms unless referred to the contrary.

The meaning of "include" or "comprise" or "consist" or "consisting" or the like specifies a property, a number, a step, an operation, a component, an element and/or a combination thereof but does not exclude other properties, numbers, steps, operations, components, elements and/or combinations thereof.

Unless defined otherwise, all terms used herein, including technical or scientific terms, have the same meaning as commonly understood by one of ordinary skill in the art. Terms such as terms that are generally used and have been in dictionaries should be construed as having meanings matched with contextual meanings in the art. In this description, unless defined clearly, terms are not ideally, excessively construed as formal meanings.

In the following description specific details of the invention have been presented to provide a more comprehensive understanding of the invention, which is a common practice in the art that the invention may be readily practiced without these specific details and by variations thereof. It will be obvious to a person skilled in the art. Moreover, detailed descriptions related to well-known functions or configurations will be ruled out in order not to unnecessarily obscure subject matters of the present invention.

Hereinafter, with reference to the accompanying drawings, preferred embodiments of the present invention will be described in detail, focusing on the parts necessary to understand the operation and action according to the present invention.

Best mode for carrying out the present invention related to a refrigerant for compressed air cooling of a hypertube transport system of the present invention and a compressed air cooling system using the same will be described below in detail.

Figure 4:
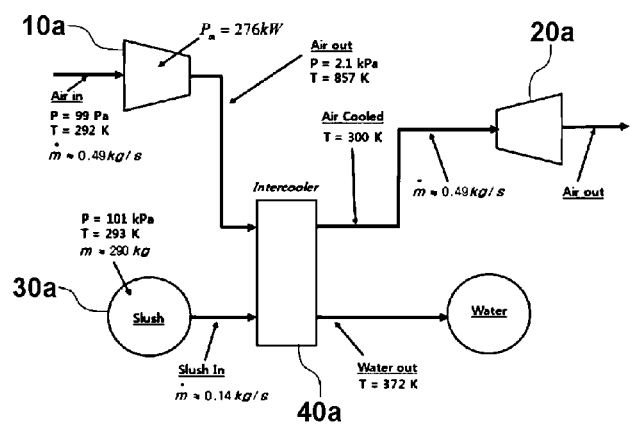
FIG. 4 is a configuration diagram illustrating a compressed air cooling system of a hypertube transport system according to the present invention.

Referring to FIG. 4, in a compressed air cooling system of a hypertube transport system according to the present invention, high-temperature air compressed by an axial compressor 10a is cooled by using a cooling solvent in which propanediol ($C_3H_8O_2$) and ethylene glycol ($C_2H_6O_2$) are mixed with slush in which ice and water are mixed.

Hereinafter, only the cooling solvent and system, which are applied to the hypertube transport system, will be described, but the present invention is not limited thereto, and the same may be applied to a subsonic capsule tube train.

The compressed air cooling system of the hypertube transport system according to the present invention cools an axial compressor 10a that compresses air introduced from a hypertube train running in a hypertube to discharge the compressed air through a nozzle expander 20a and is constituted by a slush reservoir 30a in which the cooling solvent, in which a mixture of propanediol ($C_3H_8O_2$) and ethylene glycol ($C_2H_6O_2$) is mixed with the slush in which the ice and the water mixed, is stored and an intercooler 40a in which the cooling solvent of the slush reservoir 30a contacts the hot air compressed in the axial compressor so that the air is cooled. According to such a configuration, a steam tank may be removed.

Hereinafter, the refrigerant of the present invention will be described in detail.

Figure 5:
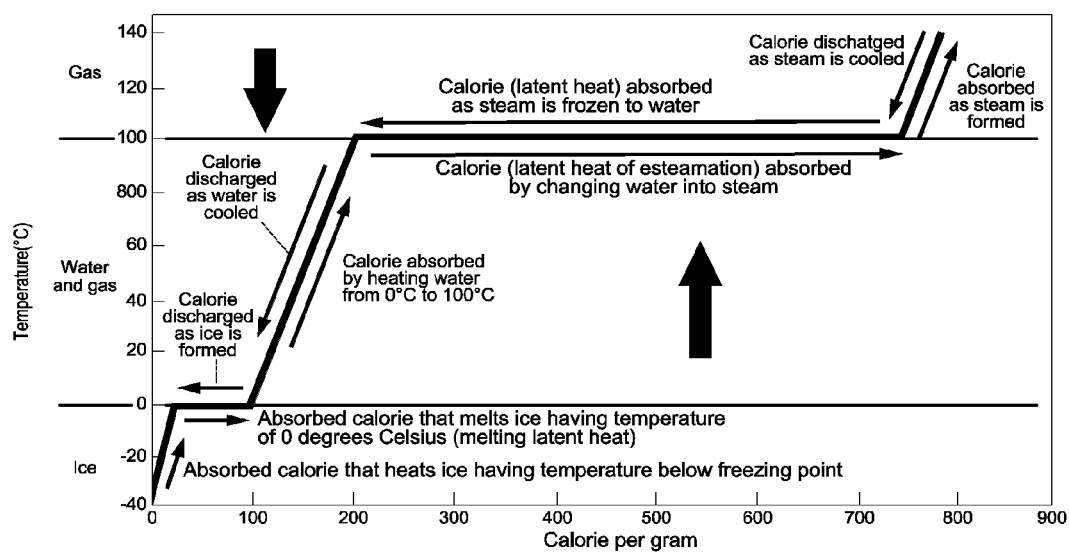
FIG. 5 is a view illustrating energy movement depending on a phase change in water.

First, FIG. 5 is a view illustrating movement of energy (cal) according to a change in state of water, i.e., a view illustrating movement of energy required for changing a state to steam by melting ice to raise a temperature and boiling the water to a temperature of more than 100° C.

In detail, latent heat of fusion (calorie required to melt 1 g of ice) is 80 cal, latent heat of vaporization (calorie required to boil 1 g of water) is 540 cal, and specific heat (calorie required to raise 1 g of water) is 1 cal. In this case, if it needs to avoid the boiling of water to a temperature of more than 100° C., the heat required to raise 1 g of ice to 99 is about 180 cal.

Figure 1:
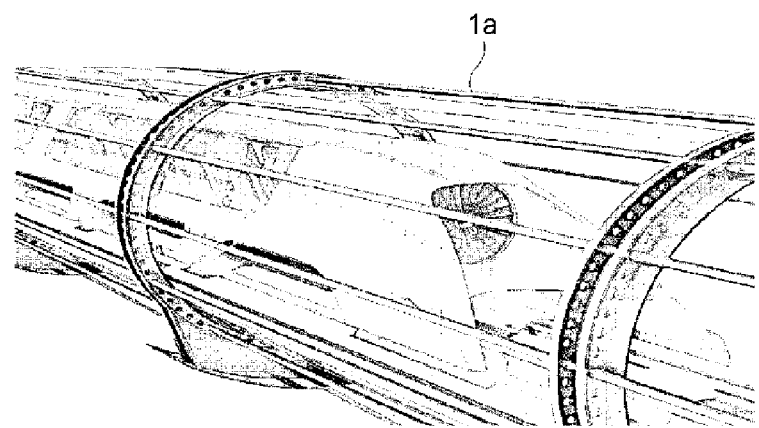
FIG. 1 is a view illustrating a front head of a general tube train capsule and a compressor.
Figure 2:
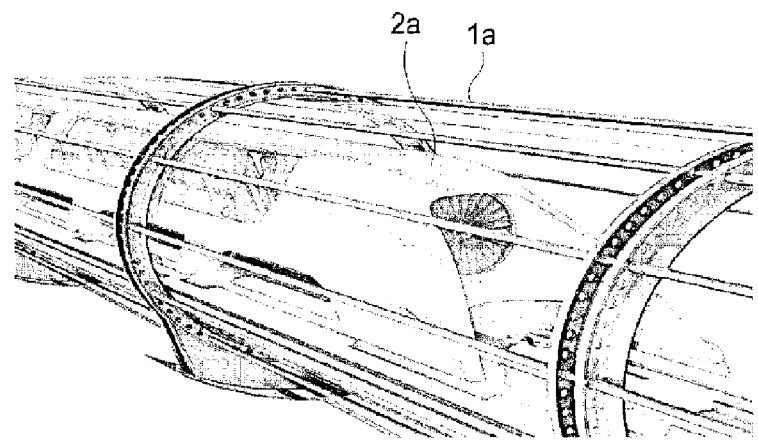
FIG. 2 is a view illustrating a general hypertube train and capsule train.
Figure 3:
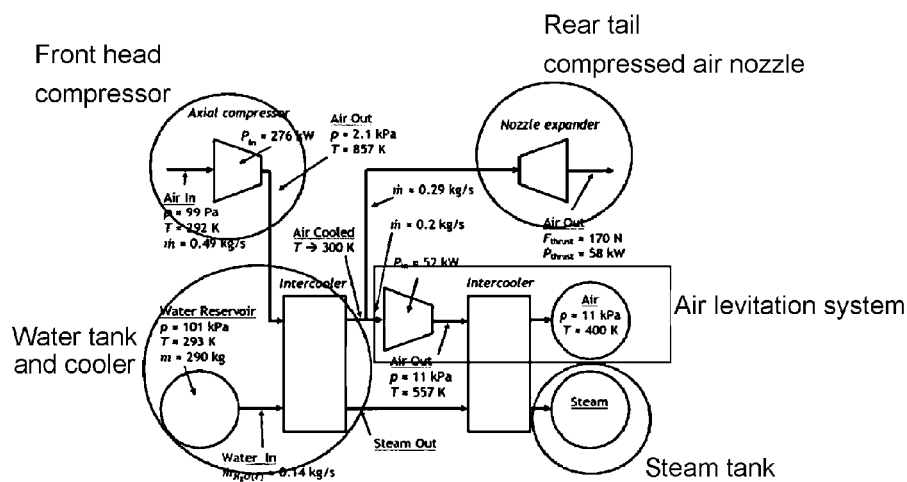
FIG. 3 is a configuration diagram of a compressed air cooling system according to a related art.

Therefore, in the case of FIG. 3, which is the cooling system according to the related art, the latent heat of vaporization required to cool the compressed air (T=857 K) by using the existing cooling water is "290 kg (coolant water)×610 Pa/g=176,900 Pa".

Meanwhile, the present invention does not cool the compressed air using pure cooling water, but cool the compressed air using slush in which ice and water are mixed. Here, a weight (x) of the slush required when the slush in which ice and water are mixed is used at the latent heat 176,900 kcal that is required for cooling the compressed air using the pure cooling water calculated above is as follows.

$x \text{ kg} \times 180 \text{ cal/g} = 176,900 \text{ kcal}$ $\therefore x = 983$ Here, when the slush in which ice and water are mixed is a weight ratio of "ice:water=85%: 15%", the total weight of the slush in which ice and water are mixed is 1,160 kg, and the total volume of the slush in which the ice and water are mixed is 1.16 m³.

This corresponds to about four times the volume (0.29 m³) of the cooling water reservoir in the existing cooling system, but it is less than 1% of the volume (207 m³) of steam generated through the vaporization of the cooling water to satisfy reality of the hypertube train.

Figure 6:
FIG. 6 is a view for explaining a difference in weight when pure water is used as a refrigerant for cooling compressed air of the hypertube train and when a mixture of ice and water is used as the refrigerant.
Figure 7:
FIG. 7 is a view for explaining a difference in volume when pure water is used as the refrigerant for cooling the compressed air of the hypertube train and when the mixture of ice and water is used as the refrigerant.

That is, referring to FIG. 6, when using only the pure cooling water (water), the water weight is 290 kg, and the total weight of the slush in which the ice and water are mixed is 1,160 kg. That is, fourth times difference occurs in weight of the slush in which ice and water are mixed. However, referring to FIG. 7, in the case of using the pure cooling water (water) alone, the sum of the existing water volume of 0.29 m³ and the steam volume of 207 m³ is generally 207 m³. However, the sum of the volume of 1.16 m³ of the slush in which ice and water are mixed and the water volume 1.1 m³ is 2.26 m³.

According to this, when using only the pure cooling water (water), the volume (207 m³) of steam is very large, and thus, since the volume of the steam tank is larger than that of the capsule vehicle, it is impossible to be practically applied as the compressed air cooling system using cooling water. However, if the slush in which ice and water are mixed is used, since a steam container having a large volume is not required, and the steam tank is removed by utilizing the slush, the overall volume reduction is 92 times, which makes it practical for the hypertube transport system.

Figure 8:
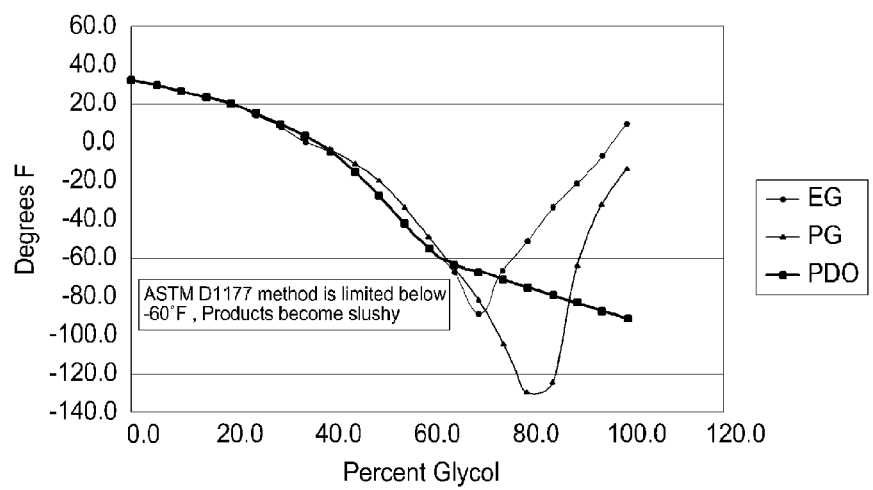
FIG. 8 is a view illustrating a change in freezing point of propanediol and ethylene glycol depending on a concentration.

Meanwhile, the present invention uses a mixture instead of the pure water in order to further lower the freezing point when preparing the slush. In this case, propanediol ($C_3H_8O_2$) and ethylene glycol ($C_2H_6O_2$), which are well mixed with water are used as a component of the mixture. In the graph of FIG. 8, EG is ethylene glycol ($C_2H_6O_2$), PG is propylene glycol ($C_3H_8O_2$), and PDO is propanediol ($C_3H_8O_2$).

At this time, the mixture consists of 90% to 70% by weight of propanediol ($C_3H_8O_2$) and 10% to 30% by weight of ethylene glycol ($C_2H_6O_2$).

As described above, in the compressed air cooling refrigerant, the slush, in which ice and water are mixed, and the mixture of propanediol ($C_3H_8O_2$) and ethylene glycol ($C_2H_6O_2$) may be preferably mixed at a weight ratio of 1:9.

Thus, according to an example of the present invention, a mixing weight ratio of water (in this case, water is slush in which ice and water are mixed) and a mixture of propanediol ($C_3H_8O_2$) and ethylene glycol ($C_2H_6O_2$) is referred to as "water: propanediol ($C_3H_8O_2$) ethylene glycol ($C_2H_6O_2$)=1: 8:1". When water and propanediol ($C_3H_8O_2$) and ethylene glycol ($C_2H_6O_2$) are mixed at the above-described weight ratio, a freezing point is lowered to "−100° C." or less, to further reduce the volume of the cooling system as a whole.

Furthermore, the refrigerant in which water is mixed with the mixture of propanediol ($C_3H_8O_2$) and ethylene glycol ($C_2H_6O_2$) is boiled at 200° C. or more, and there is no need to worry about gasification.

Next, the best mode for carrying out the invention relating to the braking apparatus and method for the train vehicle running in the vacuum tube according to the present invention will be described in detail below.

FIG. 9 is a view illustrating an electromagnet disposed in a train vehicle running in a vacuum tube and devices for controlling the electromagnet according to an embodiment of the present invention.

As illustrated in FIG. 9, a tube running train vehicle 200b runs in a tube infrastructure 10b, which is maintained in a vacuum state.

The tube infrastructure 10b has a tunnel shape, and the whole or a portion of the tube is made of a conductor for the running of the maglev train. The tube infrastructure 10b is provided by connecting tube modules, each of which has a predetermined unit length, in series. Here, each of the tube modules is made of a conductor, or a portion of the tube module extending in a running direction of the train is made of a conductor. Accordingly, the tube running train vehicle 200b runs in the tube that is entirely made of a conductor or periodically runs in the tube in a shape that passes through the conductor portion.

The tube running train vehicle 200b includes a first electromagnet 210b disposed on a front head of a vehicle body extending to have a predetermined length, a second electromagnet 220b disposed on a rear tail of the vehicle body, and a power supply 230b supplying power to the first electromagnet 210b and the second electromagnet 220b. Also, the tube running train vehicle 200b includes a running controller 240b that manages various control signals related to driving of the tube running train vehicle 200b, and in particular, generating a braking signal of the vehicle to transmit the braking signal to the power supply 230b.

Each of the first electromagnet 210b and the second electromagnet 220b may be a coil wound along a direction perpendicular to the running direction of the vehicle. When current supplied from the power supply 230b is provided to the coils by the principle of the electromagnet, a magnetic field in a direction parallel to the running direction of the train is formed. In this case, a magnetic field proceeding in the running direction of the vehicle may be formed by the first electromagnet 210b, and a magnetic field proceeding in an opposite direction to the running direction of the vehicle may be formed by the second electromagnet 220b. In this case, the magnetic field is formed so that the front heat of the tube running train vehicle 200b has an N polarity, and the rear tail of the tube running train vehicle 200b has an S polarity.

FIG. 10 is an exemplary view illustrating a shape of the electromagnet disposed in the train vehicle running in the vacuum tube 200b according to an embodiment of the present invention.

When the vehicle has a special shape or increases in length, it may be difficult to form the magnetic field in the entire vehicle by using only the first electromagnet 210b and the second electromagnet 220b, which are respectively disposed at the front head and the rear tail. Thus, one or more additional third electromagnets 250b may exist between the first electromagnet 210b and the second electromagnet 220b, but the number of third electromagnets 250b is not limited to the present invention.

Like the first electromagnet 210b or the second electromagnet 220b, the third electromagnet 250b may be a coil wound in the direction perpendicular to the running direction of the vehicle. When current supplied from the power supply 230b is provided to the coils by the principle of the electromagnet, a magnetic field in a direction parallel to the running direction of the vehicle is formed. In this case, the magnetic field in which the N polarity is formed on a front surface of the third electromagnet 250b, the S polarity is formed on a rear surface of the third electromagnet 250b may be formed.

The electromagnet may be manufactured in various forms depending on the location or the shape of the vehicle. Basically, the electromagnet may be provided as a multiple coil type 520b constituted by one coil type 510b and a plurality of conductive coils 410b. The electromagnet of the one coil type 510b or the electromagnet of the multiple coil type 520b may be selectively disposed on the front head or the rear tail of the vehicle. However, the form and arrangement of the electromagnet are not limited to the present invention.

FIG. 11 is an exemplary view for explaining a braking principle of the train vehicle 200b according to an embodiment of the present invention.

First, FIGS. 11 and 12 illustrate Faraday's law and Lenz's law, which are physics laws used to have braking force in the tube running train vehicle 200b according to an embodiment of the present invention.

FIG. 11 illustrates an example of Faraday's law in which induction electromotive force is generated when the permanent magnet 420b passes through the coil 430b, and a current value flowing through the coil 430b is determined by an impedance value of the coil 430b when the permanent magnet 420b moves at a speed or has a magnetic field that is changed as time elapses.

FIG. 12 illustrates a case in which the permanent magnet 420b passes through the inside of the coil 430b, i.e., an example of Lenz's law in which different polarities are generated between the rear tail of the permanent magnet 420b and the coil 430b if the same polarity is generated between the front head of the permanent magnet 420b and the coil 430b, which are adjacent to each other, and the permanent magnet 420b is away from the coil 430b by passing through the coil 430b.

FIGS. 13 and 14 illustrate the braking principle of the vehicle using Faraday's law and Lenz's law, which are the physical laws described above, according to an embodiment of the present invention.

First, referring to FIG. 13, when the current is supplied to the first electromagnet 210b and the second electromagnet 220b, which are mounted on the vehicle, the magnetic field is formed so that the front head of the vehicle has the N polarity in the running direction of the vehicle through the first electromagnet 210b, and the rear tail has the S polarity in a direction opposite to the direction in which the train runs through the second electromagnet 220b. Also, in the third electromagnet that may be mounted between the first electromagnet 210b and the second electromagnet 220b, the magnetic field is formed also so that a front surface has an N polarity in the same direction as the running direction of the vehicle, and a rear surface has an S polarity in a direction opposite to the direction in which the vehicle runs with respect to the third electromagnet. Through this process, the vehicle has the same characteristics as one permanent magnet 420b.

If the vehicle having the same characteristics as the permanent magnet 420b approaches a specific point 440b of the tube, the same N polarity may be formed between the front head of the vehicle and the specific point 440b of the tube according to Lenz's law to generate repulsive force, and different polarities may be formed between the rear tail of the vehicle, which passes through the specific point 440 of the tube, and the specific point 440 to generate attractive force, thereby generating braking force.

Here, when the number of specific points 440b of the tube increases, and a distance between the specific points 440b decreases to a predetermined distance or less, the specific points 440b may act as the tube having the characteristics of a conductor. This may be represented by the conductor tube 20b of FIG. 14.

The actual vehicle moves inside the conductor tube 20b formed by the above-described principle, and the braking force of the vehicle is determined in proportion to strength of the magnetic field generated in the vehicle and strength of the magnetic field induced to the conductor tube 20b. The magnetic field induced in the conductive tube 20b is determined by three parameters such as a running speed of the vehicle, strength of the magnetic field from the conductor tube (20b) to the running direction, and a material and shape of the conductive tube 20b.

However, according to an embodiment of the present invention, the parameters that may be actually controlled may be the strength of the magnetic field from the conductive tube 20b to the running direction. The parameters may be changed by adjusting the current supplied to the electromagnet through the power supply 230b.

Therefore, it is possible to control the braking force of the vehicle by adjusting the current supplied to the electromagnet through the power supply 230b of the vehicle.

Next, the best mode for carrying out the invention related to the superconducting switch for a maglev superconducting electromagnet according to the present invention will be described in detail below.

FIG. 16 is a perspective view of the maglev superconducting electromagnet provided with the superconducting switch according to an embodiment of the present invention. FIGS. 17a and 17b are equivalent circuit diagrams illustrating a state in which a superconducting coil of the superconducting electromagnet of FIG. 16 operates in a permanent current mode and a charging mode.

The superconducting switch according to this embodiment is provided in the superconducting electromagnet illustrated in FIG. 16. First, a structure of the superconducting electromagnet and its equivalent circuit will be described with reference to FIGS. 16, 17a, and 17b.

In general, the superconducting electromagnet 10c is an electromagnet manufactured by winding a wire-shaped superconductor in a coil shape by using a characteristic in which electrical resistance of the superconductor is 0 [Ω]. There is no magnetic flux saturation because no iron core is used, and thus it has the advantage of generating a high magnetic field of 2 T or more. Therefore, it is used as a train electromagnet for propulsion and magnetic levitation of the ultra-high speed maglev train requiring a strong magnetic field or the hypertube.

As illustrated in FIG. 16, the superconducting electromagnet 10c includes a superconducting coil 11c capable of generating a magnetic field, a cooling bath 20c for protecting the superconducting coil and maintaining a cryogenic temperature of below 190 degrees Celsius, a thermal shield 30c for blocking intrusion of radiant heat from the outside, and a current terminal 40c for supplying current to the superconducting coil. The superconducting electromagnet 10c is constituted by a plurality of superconducting coils 11c.

The superconducting coil 11c is provided in a cryogenic container and is cooled by liquid nitrogen at a temperature of 77K inside the cryogenic container. The superconducting coils 11c are connected in series, and both ends of each of the superconducting coils 11c are electrically connected to the current terminal 40c. Therefore, a circuit in which an external power source (DC current source) is connected to the current terminal 40c, and a flow of the current is controlled using a switching device that is adequately designed, thereby controlling excitation of the superconducting coil 11c for the magnetic levitation.

In this case, although not shown, the switching device 100c (hereinafter, referred to as a 'superconducting switch') is disposed inside the superconducting electromagnet 10C.

On the other hand, the superconducting switch 100c maintains a superconducting state when the superconducting switch 100c is disposed in the cryogenic container to short-circuit both ends of the superconducting coil 11c, as illustrated in FIG. 17a, thereby making the superconducting coil 11c having a close loop shape. Here, since electrical resistance of the coil 11c is zero, the current flows continuously to the superconducting coil 11c without supply of external power, and an operation method of the superconducting coil 11c is referred to a permanent current mode.

That is, in order to perform the permanent current mode operation, the superconducting switch 100c has to be in an ON state. For this, the superconducting switch has to be maintained below a threshold temperature, and thus, the superconducting switch is maintained in a superconducting state so that the electrical resistance is maintained to 0 [Ω].

On the other hand, as illustrated in FIG. 17b, when heat is applied to the superconducting switch 100c as power is supplied from the outside, the temperature of the superconducting wire of the superconducting switch 100c rises above the threshold temperature. Thus, the superconducting phenomenon of the superconducting switch 100c is broken to be changed to an insulating state. Thus, the electrical resistance is generated in the superconducting switch 100c so that the superconducting switch 100c is in an OFF state, and thus, the superconducting coil 11c is maintained in a charged state.

As described above, the superconducting switch 100c according to the present embodiment may be a component of the superconducting electromagnet 10c. Thus, as the ON and OFF operation are performed, the superconducting switch 100c may serve as a switching through which a charging mode for performing charging on the superconducting coil 11c and a permanent current mode in which continuous current flows are selectively performed.

FIG. 18 is a perspective view illustrating the superconducting switch to which the maglev superconducting electromagnet of FIG. 16 is applied, FIG. 19 is a cross-sectional view of the superconducting switch, taken along line I-I' of FIG. 18, FIG. 20 is an internal configuration diagram of the superconducting switch of FIG. 18, and FIG. 21 is a schematic view illustrating a state in which the superconducting wire of the superconducting switch of FIG. 18 is wound.

Referring to FIGS. 18 to 20, the superconducting switch 100c according to the present embodiment includes a case 200c, a bobbin 300c, a superconducting wire 400c, and a heater 500c.

First, the case 200c includes a main body 210c of which an upper portion is opened to accommodate the bobbin 300c, the superconducting wire 400c, and the heater 500c and a cover part 220c that covers the opened upper portion of the main body 210c.

In this case, the main body 210c has a bottom part 211c having a circular plate shape, and a sidewall part 212c having a predetermined height is formed on a circumference of the circular plate shape of the bottom part 211c so that only the upper portion is opened.

Thus, the cover part 220c covers only a portion of the opened upper portion. Here, a central portion 213c of the main body 210c is maintained in an open state to cover only a predetermined distance from the circumference That is, the cover part 220c covers only the superconducting wire 400c accommodated in the main body 210c. Accordingly, an area on which the superconducting wire 400c is wound is also formed from the circumference of the main body 210c by only a certain distance.

Thus, the superconducting wire 400c may be in non-contact with an external cooling medium (liquid helium) outside the case 200c.

The case 200c may be made of a heat insulating material, for example, a fiber reinforced plastic (FRP) material.

The bobbin 300c provides a place for winding the superconducting wire 400c, that is, serves as a support on which the superconducting wire 400c is wound.

The bobbin 300c is installed in a hollow cylindrical shape in the case 200c, that is, in the central portion 213c of the main body 210c, and thus a central space 214c is formed in the central portion 214c.

The material may be made of a conductive material so as to transfer heat generated from the heater 500c to the superconducting wire 400c.

In this case, a diameter of the bobbin 300c is less than that of a bottom surface of the main body 210c. Thus, the bobbin 300c is spaced a predetermined distance D from the sidewall part 212c of the main body 210c, and the superconducting wire 400c is wound in a winding space 450c having the predetermined distance D.

That is, the superconducting wire 400c is supported by the bobbin 300c as described above and wound up to the sidewall part 212c of the main body 210c along an outer surface of the bobbin 300c.

In this case, the superconducting wire 400c includes first and second wire units 410c and 420c stacked on each other as illustrated in FIG. 21.

The first and second wire units 410c and 420c are substantially one extending wire, and when the two ends 411c and 421c of one extending wire are positioned to face each other, as illustrated in FIG. 21. As described above, the pair of first and second wire units 410c and 420c overlapping each other extend to be positioned adjacent to each other.

In this case, since the first wire unit 410c and the second wire unit 420c are the extending one wire, the first and second wire units 410c and 420c have the same thickness and width and substantially the same shape. Thus, the first and second wire units 410c and 420c are stacked on each other and wound in the winding space 450c.

At this time, at a portion where the first and second wire units 410c and 420c are connected to each other (that is, the central portion of the superconducting wire 400c illustrated in FIG. 21), when the first and second wire units 410c are connected to each other to extend, bending may occur at the connection portion therebetween to cause damage or short circuit of the first and second wire units 410c.

Accordingly, ends 431c at which the first and second wire units 410c and 420c are connected to each other may be formed to extend in a rounded shape to prevent the damage and short circuit from occurring. That is, the first and second wire units 410c and 420c may be partially spaced apart from each other by forming the bent shape around the ends 431c connected to each other.

The first and second wire units 410c and 420c extend in the rounded shape to reach both ends 411c and 421c of each of the first and second wire units 410c and 420c so as to be adjacent to overlap each other.

As described above, when the ends 431c, which are connected to each other, of the first and second wire units 410c and 420c are formed to extend in the rounded shape, ends 413c and 423c of the first and second wire units extending from the ends 431c may be spaced apart from each other.

At this time, the one end 413c of the first wire unit 410c is disposed in the central space 214c of the bobbin 300c, and the one end 423c of the second wire unit 420c is disposed in the winding space 450c formed between the bobbin 300c and the circumference of the case 200c and thus is wound along the outer surface of the bobbin 300c.

As described above, in order to allow the ends 413c and 423c of the first and second wire units 410c and 420c to be disposed in the spaces different from each other, the bobbin 300c has a first through-hole 471c through which the one end 431c to which the first and second wire units 410c and 420c are connected to each other and a second through-hole 472c configured so that the end 413c of the first wire unit 410a extends to overlap the second wire unit 420c so as to be wound around the outer surface of the bobbin 300c.

The one end 413c of the first wire unit 410c may be formed in the center of the bobbin 300c as illustrated in the drawings. Thus, if the heater 500c includes a first heater 510c and a second heater 520c, the first and second heaters 510c and 520c may be symmetrically formed with respect to the one end 413c.

In this case, the first heater 510c is disposed in a first space 215c of the central space 214c, and the second heater 520c is disposed in a second space 216c of the central space 214c.

As described above, the first and second heaters 510c and 520c do not deviate from either of the central spaces 214c of the bobbin 300c and are respectively disposed in the first and second spaces 215c and 216c with respect to the center of the bobbin 300c so as to be symmetrical to each other. As a result, generated heat may be uniformly transferred to the first and second wire units 410c and 420c.

Furthermore, although FIG. 20 illustrates that the heater 500c includes two first and second heaters 510c and 520c, the number of heaters may be variously changed in design depending on an amount of heat transferred to the first and second wire units 410c and 420c.

As described above, since the first and second wire units are stacked and wound several times in the winding space 450c, the first and second wire units 410c and 420c may extend relatively lengthily, and thus, it may be possible to implement the superconducting wire 400c extending relatively lengthily in the space of the volume, thereby manufacturing the superconducting switch having the large resistance (Rpcs).

Meanwhile, the entire outer circumferential surface of each of the first and second wire units 410c and 420c may be covered with an insulator. In this case, the first and second wire units 410c and 420c may be insulated using an insulating tape, for example, a cotton-rubber tape. The cotton-rubber tape is generally used for electrical insulation and has a slight viscosity.

As each of the first and second wire units 410c and 420c is covered with the insulator, the first and second wire units 410c and 420c may be insulated from each other and also be insulated from the bobbin 300c.

As described above, when heat is applied as the first and second wire units 410c and 420c are insulated from each other to generate the resistance, the resistance between the first and second wire units 410c and 420c may decrease due to the electrical connection between the first and second wire units 410c and 420c, and the switching function of the superconducting wire 400c by the resistance may be faithfully performed.

Meanwhile, both ends 412c and 422c of the first and second wire units 410c and 420c extend through a third through-hole 473c formed in the bobbin 300c to extend outward. Thus, it may be connected to the superconducting magnet 10c disposed outside to perform the switching function.

The function of the superconducting switch 100c for the permanent current mode operation of the maglev superconducting electromagnet according to the present embodiment configured as described above is as described with reference to FIGS. 17a and 17b.

That is, when it is necessary to apply current from an external power source to the superconducting magnet, the current terminal 40c is connected. When the current terminal 40c is connected, a closed circuit is formed between the external power supply and the superconducting magnet so that the current flows.

In this case, when the current is applied from the external power source, the heater 500c also operates, and thus, heat is generated from the heater 500c.

Thus, the heat generated by the heater 500c is transferred to the bobbin 300c and is transferred from the bobbin 300c to the superconducting wire 400c.

That is, when the heat is transferred to the superconducting wire 400c, a temperature of the superconducting wire 400c increases to increase above a so-called critical temperature, and the superconducting state maintained in the superconducting wire 400c is broken and then changed into the insulated state.

Therefore, electric resistance is generated in the superconducting wire 400c changed into the insulated state, and thus the superconducting switch 100c is turned off.

Thus, the power supplied from the external power source is charged in the superconducting coil 11c. On the contrary, in order to cut off the current applied to the superconducting magnet from the external power supply, when the current terminal 40c is disconnected, the current supply is stopped because no closed circuit is formed between the external power supply and the superconducting magnet.

Accordingly, the heat from the heater 500c is no longer generated, and thus, the superconducting wire 400c is cooled again. Thus, when the superconducting wire 400c is cooled below the so-called critical temperature, the superconducting wire 400c is changed from phase conduction to superconductivity to maintain the cryogenic state.

Accordingly, the electrical resistance of the superconducting wire 400c is extinguished, and the superconducting switch 100c is turned on.

That is, the superconducting switch 100c is cooled below a predetermined threshold temperature to exhibit superconductivity, thereby forming the closed circuit with the superconducting magnet. Since the superconducting wire 400c has no resistance component, the superconducting wire 400c may constitutes a permanent current mode in which current continuously flows even though no more current is supplied from the outside.

According to the embodiments of the present invention, since the first and second wire units are stacked and wound several times in the winding space, the first and second wire units may extend relatively lengthily, and thus, it may be possible to implement the superconducting wire extending relatively lengthily in the space of the volume, thereby manufacturing the superconducting switch having the large resistance (Rpcs).

Particularly, when the energy stored in the superconducting coil of the superconducting magnet is large in operating in the permanent current mode, the discharge rate may increase, which is advantageous to apply to the large-capacity maglev superconducting electromagnet.

Also, since the heater and the bobbin are installed inside the case and are covered by the cover part, the heater and the bobbin may do not directly contact the external liquid nitrogen to prevent the bubble phenomenon of the liquid nitrogen from occurring by the superconducting switch, thereby improving the driving stability.

Also, since each of the first and second wire units is insulated through the insulating tape, the first and second wire units may be electrically insulated from each other even if overlapping each other and may be insulated from the bobbin. As described above, when heat is applied as the first and second wire units are insulated from each other to generate the resistance, the resistance between the first and second wire units may decrease due to the electrical connection between the first and second wire units, and the switching function of the superconducting wire by the resistance may be faithfully performed.

Furthermore, as the first and second wire units are formed so that each of both the ends of the first and second wire units, which are connected to each other, extend in the rounded shape, when the first and second wire units extend to contact each other, the damage or short circuit of the first and second wire units due to the bending at the connection portion therebetween may be prevented.

Next, the best mode for carrying out the invention relating to the vehicle driving stabilization apparatus of the hypertube transport system according to the present invention will be described in detail below.

FIG. 22 is an explanatory diagram illustrating the hypertube transport system to which the present invention is applied.

As illustrated in FIG. 22, the hypertube transport system generally runs at a high speed of 1,200 km/h or more in a maglev and propelled manner inside a closed partial vacuum tube that is isolated from an external atmospheric pressure.

An electromagnetic rail is installed inside the tube so that the vehicle runs in the maglev and propulsion manner, and the superconducting electromagnet or a magnetic body that performs a similar function is installed at the vehicle side. Furthermore, a wheel is installed as an auxiliary running unit on a side of the vehicle for driving the wheel in an atmospheric pressure section and a low speed section.

The hypertube transport system according to the present invention is disclosed in Korea Patent Publication No. 2010-0090406 (Title of Invention: PROPULSION AND GUIDANCE TYPE TUBE TRANSPORTATION SYSTEM), Korean Patent Registration No. 1015170 (Title of Invention: TUBE TYPE MAGLEV TRAIN), Korean Patent Registration No. 1130807 (Title of Invention: VACUUM SECTIONAL MANAGEMENT SYSTEM AND VACUUM BLOCKING SCREEN DEVICE FOR THE TUBE RAILWAY), and Korean Patent Registration No. 1130811 (Title of Invention: DEVICE AND CONTRAL METHOD OF INTERFACE STATION BETWEEN TUBE RAILWAY AND ATMOSPHERE RAILWAY) by the applicant.

The basic technical configuration of the hypertube transport system to which the present invention is applied will be cited in the above-mentioned patent documents, and the technical gist of the present invention is not limited by the basic technical configuration.

The hypertube transport system has a special vehicle running environment compared to an existing vehicle, and this special vehicle running environment may include a case in which the vehicle runs in the tube in the partial vacuum state sealed from an external atmospheric pressure, a case in which the vehicle runs by the electromagnetic force interaction between the electromagnetic rail inside the tube and the electromagnet on the vehicle side, a case in which air resistance is generated by high-speed running of the vehicle inside the partial vacuum tube, and a case in which the vehicle constituted by a vehicle body and a bogie is used.

In such the hypertube transport system, due to the special vehicle running environment, a situation in which the vehicle is often impacted from various disturbances such as vibration, electromagnetic force, air resistance, and the like may occur.

Accordingly, the present invention proposes a vehicle driving stabilization technique, i.e., a technique in which an elastic plate, a passive suspension, an active suspension, an electromagnetic force damper, and an aerodynamic adjustment vane are selectively installed in a vehicle running in a tube that is in a partial vacuum state to reduce an impact caused by various disturbances such as vibration, electromagnetic force, air resistance, and the like, which are caused by special vehicle driving environments, thereby improving driving stability of the vehicle. In the present invention, the elastic plate, the passive suspension, the active suspension, the electromagnetic force damper, and the aerodynamic adjustment vane of the vehicle driving stabilization apparatus will be referred to collectively as a disturbance impact attenuator.

Hereinafter, the elastic plate, the passive suspension, and the active suspension of the vehicle driving stabilization apparatus according to the present invention will be described with reference to FIGS. 23a and 23b. Also, the electromagnetic force damper will be described with reference to FIG. 24, and the aerodynamic adjustment vane of the vehicle driving stabilization apparatus according to the present invention will be described with reference to FIG. 25.

FIGS. 23a and 23b are configuration diagrams of the vehicle driving stabilization apparatus according to a first example of the present invention.

As illustrated in FIGS. 23a and 23b, the first hypertube transport system according to the present invention includes a vehicle constituted by a tube 110d, a vehicle body 100d, and a bogie 101d in the partial vacuum state sealed from the external atmospheric pressure and a wheel 103d installed at a side of the bogie 101d to serve as an auxiliary running unit in the atmospheric pressure section. The vehicle runs in the tube in the maglev and propulsion manner by the electromagnetic force interaction between the electromagnetic rail 106d provided at an inner side of the tube 110d and the superconducting electromagnet 107d or other magnetic material provided on the side of the bogie 101d. Reference numeral 102d denotes a guiding wheel, and reference numeral 105d denotes a railway.

In the present invention, the superconducting electromagnet is installed on the vehicle side in the case of the maglev and propulsion of the vehicle as an example. However, it is possible to use any magnetic method such as a phase conduction suction method other than the superconducting electromagnetic method, and it is preferable to understand that the superconducting electromagnet 107d described below as an example collectively refers to a magnet.

As may be seen in FIGS. 23a and 23b, the inner sidewall of the tube 110d in the hypertube transport system are provided with components for the maglev and propulsion and the running and braking of the vehicle by the wheels. In the vehicle, the vehicle body 100d provides a passenger boarding space, and most of the components related to vehicle running and braking are installed in the bogie 101d.

Accordingly, the passive suspension 113d, the active suspension 112d, the elastic plate 104d and the electromagnetic force damper of the vehicle driving stabilization apparatus may be preferably installed at the side of the bogie 101d to attenuate transmission of the impact due to various disturbances to the vehicle body 100d of the passenger boarding space.

The elastic plate 104d of the vehicle driving stabilization apparatus proposed in the present invention is installed on the side of the vehicle bogie 101d, and preferably the vehicle bogie 101d adjacent to the vehicle body 100d in an inward direction from the outside of the vehicle. In FIGS. 23a and 23b, it is seen that the elastic plate 104d is installed at a rear end of the superconducting electromagnet 107d or other magnetic material installed in the vehicle bogie 101d.

In the present invention, the elastic plate 104d is installed at the rear end of the superconducting electromagnet 107d or other magnetic material on the side of the vehicle bogie 101d to attenuate the impacts, which are applied by various disturbances such as physical deformation of the tube such as tube protrusion, tube drooping, tube joint step, and the like, an installation alignment error of the electromagnetic rail inside the tube, non-uniform electromagnetic force between the tube side electromagnetic rail and the vehicle side electromagnet, centrifugal force in the curved running section, air resistance or irregular air flow inside the tube, and the like, at the side of the bogie 101d, thereby preventing the impacts from being transmitted to the vehicle body 100d.

The elastic plate 104d may be made of, for example, a rubber member, and any member having a certain amount of rigidity and having impact attenuation performance such as vibration may be used.

The passive suspension 113d of the vehicle driving stabilization apparatus proposed by the present invention is provided at a portion at which the vehicle bogie 101d and the vehicle body 100d contact each other. The passive suspension 113d may be constituted by a spring 114d and a damping member 115d, and the spring 114d may buffer the impact applied by various disturbances to the vehicle body 100d from the vehicle bogie 101d to prevent the impact from being transmitted and also allow the damping member 115d to absorb and suppress the impact such as vibration applied by various disturbances.

The active suspension 112d of the vehicle driving stabilization apparatus proposed by the present invention includes an actuator for driving a suspension component such as an impact absorber, a spring, and a cylinder, a controller for controlling an operation of the actuator, and a sensor for detecting a vehicle driving state. Here, the suspension component is sufficient to employ the known technique, the actuator may be used without limitation, such as hydraulic, pneumatic, electromagnetic, electro-liquid manners, and the like.

Suspension components of the active suspension 112d are installed at an upper side of the vehicle bogie 101d supporting the vehicle body 100d to control the behavior of the vehicle body 100d in a propulsion direction (X axis), a horizontal direction (Y axis), and a vertical direction (Z axis) according to the driving of the actuator, thereby maintaining a vehicle posture corresponding to the optimum riding comfort and attenuating the impacts such as the vibrations applied by various disturbances.

The sensor of the active suspension 112d detects a vertical displacement, a horizontal displacement, a speed, and an acceleration by the vehicle body 100d and the vehicle bogie 101d to transmit the detected values of the vehicle driving state to the controller of the active suspension 112d.

The controller of the active suspension unit 112d determines the vehicle driving state by using the vertical displacement, the horizontal displacement, the speed, and the acceleration transmitted from the sensor and controls the actuator driving according to the determined vehicle driving state, thereby adjusting the behavior of the vehicle body 100d so that the suspension components operate in the propulsion direction (X axis), the horizontal direction (Y axis) and the vertical direction (Z axis).

FIG. 24 is a configuration diagrams of a vehicle driving stabilization apparatus according to a second example of the present invention.

An electromagnetic force damper 108d of the vehicle travel stabilization apparatus proposed in the present invention is installed on a side of the vehicle bogie 101d, preferably installed at a predetermined portion of the vehicle bogie 101d that is adjacent to the electromagnetic rail 106d that is installed on the inner sidewall of the tube 110d outward from the inside of the vehicle.

Preferably, as illustrated in FIG. 24, the electromagnetic force damper 108d is installed at a front end of the superconducting electromagnet 107d or other magnetic body installed in the vehicle bogie 101d so as to be installed on a side surface of the vehicle bogie 101d to face the electromagnetic rail 106d installed on the inner sidewall of the tube 110d.

The electromagnetic force damper 108d attenuates the electromagnetic vibration due to the disturbance generated between the vehicle-side superconducting electromagnet 107d and the tube-side electromagnetic rail 106d, for example, the installation alignment error of the electromagnetic rail inside the tube, the non-uniform electromagnetic force between the tube side electromagnetic rail and the vehicle side electromagnet, and the like.

The electromagnetic force damper 108d may be made of a member capable of exhibiting electromagnetic force damping performance through a member having a conductive plate or a special coil embedded therein, for example, may be provided as an aluminum plate.

FIG. 25 is a configuration diagrams of a vehicle driving stabilization apparatus according to a third example of the present invention.

An aerodynamic adjustment vane 109d of the vehicle driving stabilization apparatus proposed in the present invention is installed on an outer portion of the vehicle, preferably, a portion of the vehicle, which is exposed to the inside of the tube that is in the partial vacuum state.

As illustrated in FIG. 25, the aerodynamic adjustment vane 109d provided on the outer portion of the vehicle attenuate the air resistance or the irregular air fluctuation caused by the air flow passing through a gap between the inner wall of the tube and the outside of the vehicle, thereby stably maintaining the vehicle posture. That is, artificial force is generated to the vehicle by using a flow of air generated when the vehicle runs to catch the shaking of the vehicle.

Although FIG. 25 illustrates that the aerodynamic adjustment vane 109d is provided on the upper side of the vehicle, the aerodynamic adjustment vane 109d may be installed on any portion such as the side surface of the vehicle to attenuate the air resistance caused by the air flow passing through the gap between the inner wall of the tube and the outside of the vehicle, thereby stably maintaining the vehicle posture.

The aerodynamic adjustment vane 109d is installed in the vehicle in a fixed form to attenuate the air resistance due to the air flow inside the tube when the vehicle runs or is installed in the vehicle in a movable form that moves according to the air flow inside the tube when the vehicle runs.

Next, the best mode for carrying out the invention relating to the vehicle braking apparatus of the hypertube transport system according to the present invention will be described in detail below.

FIG. 26a is an explanatory diagram illustrating the hypertube transport system to which the present invention is applied.

As illustrated in FIG. 26a, in general, in the hypertube transport system, the vehicle runs in the tube that is the partial vacuum state at a high speed of 1,200 km/h or more in the maglev and propulsion manner. In order to prevent the vehicle speed from decreasing due to the air resistance inside the tube, the compressor is provided on the front head-side of the vehicle to compress the air flowing into the front head of the vehicle, thereby discharging the compressed air backward. In addition, it is seen that a fan of the compressor is shown on the front head-side of the vehicle in FIG. 26a.

That is, the vehicle running at the high speed inside the tube is limited by a maximum speed through the Kantrowitz limit. As the maximum speed approaches a speed of sound, a flow rate between the tube and the vehicle is almost zero to cause a choking phenomenon. In order to overcome these limitation, an axial compressor is provided on the front head of the vehicle to avoid the choking phenomenon.

The hypertube transport system according to the present invention is disclosed in Korea Patent Publication No. 2010-0090406 (Title of Invention: PROPULSION AND GUIDANCE TYPE TUBE TRANSPORTATION SYSTEM), Korean Patent Registration No. 1015170 (Title of Invention: TUBE TYPE MAGLEV TRAIN), Korean Patent Registration No. 1130807 (Title of Invention: VACUUM SECTIONAL MANAGEMENT SYSTEM AND VACUUM BLOCKING SCREEN DEVICE FOR THE TUBE RAILWAY), and Korean Patent Registration No. 1130811 (Title of Invention: DEVICE AND CONTRAL METHOD OF INTERFACE STATION BETWEEN TUBE RAILWAY AND ATMOSPHERE RAILWAY) by the applicant.

The basic technical configuration of the hypertube transport system for the purpose of technical understanding of the present invention is as follows, it will be clear that the technical gist of the present invention is not limited by the basic technical configuration.

The hypertube transport system includes a tube that is isolated from the outside to maintain the inside at a low pressure, that is, a vacuum state, a vehicle running inside the tube in the vacuum state, a liner synchronous motor (LSM) constituted by a stator provided at a track side of the tube and a rotor provided in the vehicle to correspond to the tube-side stator to generate propulsion force in a longitudinal direction of the tube, a levitation guide unit that levitates the vehicle by the magnetic force and places the vehicle on a concentric axis within the tube, and a power supply device installed on an upper portion of an inner circumferential surface of the tube and an outer circumferential surface of the vehicle corresponding to the upper portion to supply power to the vehicle.

Hereinafter, the vehicle braking apparatus of the hypertube transport system proposed in the present invention will be described with reference to the accompanying drawings, and the detailed description of the basic technical configuration of the hypertube transport system will be omitted.

FIG. 26b is a configuration diagram illustrating a vehicle braking apparatus of a hypertube transport system according to a first example of the present invention, FIGS. 27a to 27c are perspective views of a compressor opening/closing vane of FIG. 26b, FIG. 28 is a graph illustrating vehicle braking performance when the compressor opening/closing vane of FIG. 26b is used, FIG. 29 is a perspective view of a flow gap blocking vane of FIG. 26b, FIG. 30 is an explanatory view illustrating an operation of the flow gap blocking vane of FIG. 26b, FIGS. 31a and 31b are explanatory view illustrating an operation control algorithm of a vehicle braking apparatus according to a first example of the present invention, FIG. 32 is an explanatory view illustrating an angle of a compressor opening/closing vane and an angle of a flow gap blocking vane according to the first example of the present invention, FIGS. 33a, 33b, 34a, and 34b are configuration diagrams illustrating a vehicle braking apparatus of a hypertube transport system according to a second example of the present invention, FIG. 35 is an explanatory view illustrating a water supply device for a moisture expansion material according to the second example of the present invention, and FIGS. 36a to 36e are explanatory views illustrating the moisture expansion material according to the second example of the present invention.

The present invention proposes a vehicle braking apparatus of a hypertube transport system, that is, a vehicle front-side air flow blocking technique that is optimized for a partial vacuum tube environment.

Particularly, according to the present invention, a compressor opening/closing vane, a flow gap blocking vane, and a moisture expansion material are selectively installed at a front head-side of a vehicle running in a tube that is in a partial vacuum state to block a flow of air passing through the front head-side of the vehicle or block a flow of air passing through a gap between the vehicle and the tube, thereby braking the vehicle. In the present invention, the compressor opening/closing vane, the flow gap blocking vane, and the moisture expansion material may be referred to as a vehicle side air flow blocking part.

Also, the present invention proposes an intelligent control algorithm (so-called: KLB & VC (Kantrowitz Limit Braking & Velocity Control)) in performing of vehicle braking through the compressor opening/closing vane and the flow gap blocking vane installed on a front head of the vehicle.

As described above, the vehicle running at the high speed inside the tube is limited by a maximum speed through the Kantrowitz limit. As the maximum speed approaches a speed of sound, a flow rate between the tube and the vehicle is almost zero to cause a choking phenomenon. As described above, if the Cantrowitz limit is applied to the vehicle running in the tube, the maximum speed of the vehicle is determined within the tube. In this case, the speed of the vehicle to which the Kantroywitz limit is applied is determined by a cross-sectional ratio of the vehicle and the tube at a speed slightly lower than the sound speed, i.e., a blockage ratio (BR).

Accordingly, the present invention is to propose a vehicle deceleration and braking technique that are implemented by the air flow blocking technique applying the Kantrowitz Limit.

FIG. 26a is an explanatory diagram illustrating the hypertube transport system to which the present invention is applied.

As illustrated in FIG. 26b, a compressor fan 21e is provided on the front head-side of the vehicle 20e that runs in the tube 10e in a partial vacuum state, and in particular, a compressor opening/closing vane 30e or/and a flow gap blocking vane 40e as vehicle braking devices based on an air flow blocking technique using the Kantrowitz Limit proposed in the present invention is/are provided at the front head-side of the vehicle.

The compressor opening/closing vane 30e is preferably installed at a front end of the vehicle front head-side compressor fan 21e, and as illustrated in FIG. 26b, the compressor opening/closing vane 30e performs an operation so that the compressor opening/closing vane 30e is opened to allow air to be introduced into the vehicle front head-side compressor fan 21e while the vehicle runs as illustrated in FIG. 26b and is gradually closed to block the air flow into the vehicle front head-side compressor fan 21e during the vehicle deceleration and braking. A control of an operation of the compressor opening/closing vane 30e is performed by an intelligent control algorithm (so-called: KLB & VC (Kantrowitz Limit Braking & Velocity Control)) to be described later. Although not shown in the drawings, the operation of the compressor opening/closing vane 30e is performed by a driving device such as an actuator, a hydraulic motor, a pneumatic motor, and the like.

The flow gap blocking vane 40e is preferably installed in a circumferential direction of the vehicle 20e, and as illustrated in FIG. 26b, the flow gap blocking vane 40e is laid down in a longitudinal direction of the vehicle 20e. Thus, air passes through the gap between the tube 10e and the vehicle 20e, and the flow gap blocking vane 40e performs an operation to be gradually erected (unfolded) in a direction of the cross-sectional area of the vehicle 20e so that the air does not pass through the gap between the tube 10e and the vehicle 20e during the vehicle deceleration and braking. A control of an operation of the flow gap blocking vane 40e is performed by an intelligent control algorithm (so-called: KLB & VC (Kantrowitz Limit Braking & Velocity Control)) to be described later. Although not shown in the drawings, the operation of the flow gap blocking vane 40e is performed by a driving device such as an actuator, a hydraulic motor, a pneumatic motor, and the like.

FIG. 26b illustrates an example in which the flow gap blocking vane 40e is provided on the vehicle front head-side. However, the present invention is not limited thereto, for example. it is sufficient if the flow gap blocking vane 40e is provided in the vehicle circumferential direction such as a front head-side, a middle side, and a rear tail side in the vehicle longitudinal direction. Furthermore, the flow gap blocking vane 40e is installed to be in close contact with the circumferential surface of the vehicle 20e while the vehicle runs, and in FIG. 26b, it may be easily understood by those skilled in the art to have a rather erect shape to show the flow gap blocking wing 40e.

FIGS. 27a to 27c are perspective views of the compressor opening/closing vane of FIG. 26b.

FIG. 27a is a front view of the compressor opening/closing vane 30e while the vehicle runs, and FIG. 27b is a side view of the compressor opening/closing vane 30e while the vehicle runs so as to show a state in which the compressor opening/closing vane 30e is opened. An open state of the compressor opening/closing vane 30e may be seen as a grill shape.

FIG. 27c is a side view of the compressor opening/closing vane 30e when the vehicle is decelerated and braked so as to show that the compressor opening/closing vane 30e are closed.

As illustrated in FIG. 27c, when the compressor opening/closing vane 30e is completely closed so that all air inflow is blocked by the front head-side compressor fan 21e of the vehicle, the vehicle 20e running in the tube, which is in the partial vacuum state, at a high speed of 1,200 km/h may be decelerated to a speed of 700 km/h by the Kantrowitz Limit during deceleration and braking of the vehicle.

FIG. 28 is a graph illustrating the vehicle braking performance when the compressor opening/closing vane of FIG. 26b is used.

FIG. 28 is illustrates performance in which the running speed of the vehicle 20e is decelerated by the Kantrowitz Limit phenomenon in the tube 10e that is in the partial vacuum state when the compressor opening/closing vane 30e of the present invention is closed. Here, 'Vo' means a sound speed.

That is, when the compressor opening/closing vane 30e is completely closed, a flow is possible only through the gap between the tube 10e and the vehicle 20e in tube 10e in a vacuum state, and eventually, a choking phenomenon occurs to decelerate the vehicle 20e below a speed of 700 km/h.

FIG. 29 is a perspective view of the flow gap blocking vane of FIG. 26b.

FIG. 29 is a front view of the flow gap blocking vane 40e when the vehicle is decelerated and braked so as to show a state in which the flow gap blocking vane 40e is fully erected (unfolded). The state in which the flow gap blocking vane 40e is fully erected (unfolded) may allow an end of the flow gap blocking vane 40e to be completely in contact with an inner surface of the tube 10e. Accordingly, a shape and size of the flow gap blocking vane 40e may be designed by a shape and size of the vehicle 20e in circumference and longitudinal directions, a shape and size of an inner surface of the tube 10e in circumference and longitudinal directions, and a gap between the vehicle 20e and the tube 10e.

As described above, the vehicle 20e running in the tube that is in the partial vacuum state at a high speed of 1,200 km/h or more by the Kantrowitz Limit during the deceleration and braking using the compressor opening/closing vane 30e according to the present invention may be decelerated to a speed of 700 km/h or less. Then, when the air gap blocking vane 40e is fully erected (unfolded), for example, when the vane angle is 90°, air passing between the tube 10e and the vehicle 20e may be completely blocked to gradually decrease in speed and then stop.

FIG. 30 is an explanatory view illustrating an operation of the flow gap blocking vane of FIG. 26b.

As illustrated in FIG. 30, the flow gap blocking vane 40e may be mounted on an outer surface of the vehicle 20e in the form of a hinge 41e to ascend and descend by the driving device 42e such as the actuator, the hydraulic motor, or the pneumatic motor, and the flow gap blocking vane 40e and the driving device 42e may be coupled to a sliding member 43e.

Next, the present invention proposes an intelligent control algorithm (so-called: KLB & VC (Kantrowitz Limit Braking & Velocity Control)) in performing of the vehicle braking through the compressor opening/closing vane 30e and the flow gap blocking vane 40e, which are proposed in the present invention.

FIGS. 31a and 31b are explanatory view illustrating an operation control algorithm of the vehicle braking apparatus according to a first example of the present invention, and FIG. 32 is an explanatory view illustrating an angle of the compressor opening/closing vane and an angle of the flow gap blocking vane according to the first example of the present invention.

In FIGS. 31a, 31b and 32, $V_t$ is a time-varying speed of the vehicle, $V_a$ is a speed of the vehicle averaged over time, $V_T$ is a target speed of the vehicle, $a_g$ is a vehicle deceleration, and $X°$ is a closing angle of the compressor opening/closing vane, and $Y°$ is an erected angle of the flow gap blocking vane.

When the vehicle 20e runs in the tube 10e that is in the partial vacuum state, and then the vehicle needs to be decelerated and braked, the vehicle front head-side compressor is turned off. In the state in which the vehicle 20e runs normally, the vehicle front head-side compressor is driven, the compressor opening/closing vane 30e is open, and the flow gap blocking vane 40e is not in a standing state (unfolded).

As the vehicle front head-side compressor is turned off, the running speed of the vehicle 20e is decelerated from 1,200 km/h to 800 km/h or less by the Kantrowitz Limit.

When the speed decelerated by the turn off of the vehicle front head-side compressor is not the target vehicle speed VT, the vehicle moves forward until the vehicle target speed is reached while gradually increasing in angle of the compressor opening/closing vane 30e, for example, by 1°.

At this time, when the vehicle deceleration $a_g$ does not cause inconvenience to the passengers mind and body due to the influence of the vehicle deceleration operation such as 0.5 g or less, the angle $X°$ of the compressor opening/closing vane 30e gradually increases, for example, by 1° to perform the closing operation of the compressor opening/closing vane 30e. That is, unless extreme vehicle braking conditions occur, it is preferable to suspend the operation of closing the compressor opening/closing vane 30e when the vehicle deceleration ag exceeds 0.5 g to cause the inconvenience to the passenger's mind and body due to the vehicle deceleration operation. For example, if the deceleration ag of the vehicle exceeds 0.5 g, the operation of closing the compressor opening/closing vane 30e is stopped until the deceleration of the vehicle reaches 0.5 g or less, and then the operation of closing the compressor opening/closing vane 30e starts again. This control may be performed until the compressor opening/closing vane 30e are completely closed.

When the compressor opening/closing vane 30e is completely closed, the running speed of the vehicle 20e is decelerated at a speed of approximately 700 km/h or less due to the second Kantrowitz Limit.

Subsequently, the vehicle speed, for example, the time-averaged vehicle speed $V_a$ or the time-varying vehicle speed $V_t$ is measured to stop the operation of closing the compressor opening/closing vane 30e when the vehicle speed is equal to or less than the vehicle target speed VT.

The vehicle speed, for example, the time-averaged vehicle speed $V_a$ or the time-varying vehicle speed Vt, is measured so that, when the vehicle speed exceeds the vehicle target speed VT, the erected angle Y° of the flow gap blocking vane 40e gradually increases, for example, by 1° until the vehicle reaches the vehicle target speed.

At this time, when the vehicle deceleration $a_g$ does not cause the inconvenience to the passengers mind and body due to the influence of the vehicle deceleration operation such as 0.5 g or less, the angle Y° of the flow gap blocking vane 40e gradually increases, for example, by 1° to perform the operation of erecting the flow gap blocking vane 40e. That is, unless extreme vehicle braking conditions occur, it is preferable to suspend the operation of erecting the flow gap blocking vane 40e when the vehicle deceleration $a_g$ exceeds 0.5 g to cause the inconvenience to the passengers mind and body due to the vehicle deceleration operation. For example, if the deceleration $a_g$ of the vehicle exceeds 0.5 g, the operation of erecting the flow gap blocking vane 40e is stopped until the deceleration of the vehicle reaches 0.5 g or less, and then the operation of erecting the flow gap blocking vane 40e starts again. This control may be performed until the angle Y° of the flow gap blocking vane 40e reaches 90°.

While performing the operation of erecting the flow gap blocking vane 40e, the vehicle speed, for example, the time-averaged vehicle speed $V_a$ or the time-varying vehicle speed $V_t$ is measured, and when the vehicle target speed $V_T$ is reached, the operation of erecting the flow gap blocking vane 40e is finished.

Next, the vehicle braking apparatus for the hypertube transport system according to a second example of the present invention will be described in detail with reference to FIGS. 33a to 36e.

FIGS. 33a, 33b, 34a, and 34b are configuration diagrams illustrating the vehicle braking apparatus of the hypertube transport system according to the second example of the present invention.

According to the second example of the present invention, a moisture expansion material 50e is installed in a circumferential direction of the front head-side of the vehicle 20e running in the tube that is in the partial vacuum state to block air passing through the gap between the tube 10e and the vehicle 20e, thereby performing the vehicle deceleration and braking.

Figure 33A:
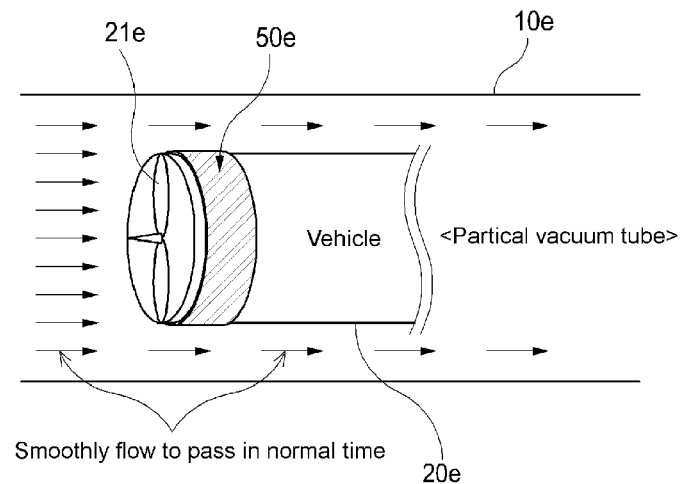
Figure 33B:
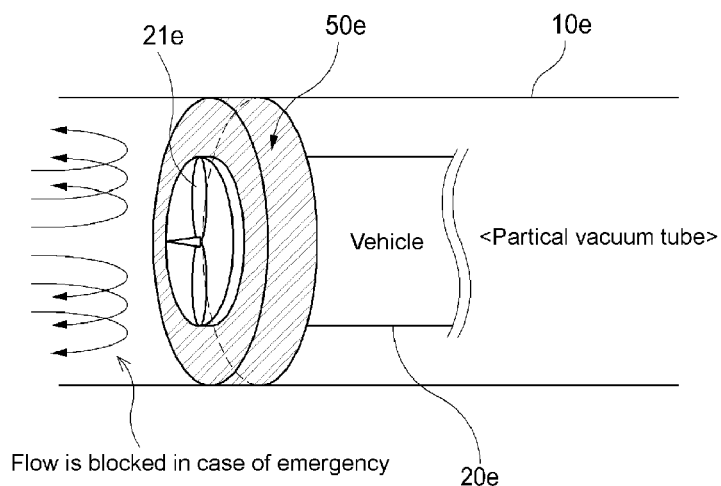

FIGS. 33a and 33b are side and front views of the hypertube transport system in which the moisture expansion material 50e is provided in the vehicle 20e in a normal running environment without the deceleration and braking. In the state in which the moisture expansion material 50e is not expanded, i.e., in the normal state, the air may pass through the vehicle front head-side compressor and the gap between the tube 10e and the vehicle 20e, and thus, it is seen that there is no effect on the vehicle deceleration and braking.

Figure 34A:
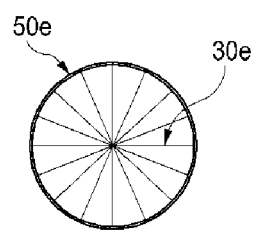
Figure 34B:
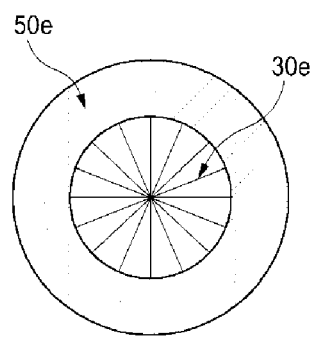

FIGS. 34a and 34b are side and front views of the hypertube transport system in which the moisture expansion material 50e is provided in the vehicle 20e when the vehicle is decelerated and braked. It is seen that the vehicle deceleration and braking is performed by blocking the flow through the gas between the tube 10e and the vehicle 20e while the moisture expansion material 50e is expanded to perform the vehicle deceleration and braking. In addition, according to the second example of the present invention, the compressor opening/closing vane 30e described in the first example of the present invention may be closed to block the flow to the vehicle front head-side compressor.

That is, in the normal running conditions without the vehicle deceleration and braking, the moisture expansion material 50e having a minimum volume is provided at the front head-side of the vehicle 20e. Then, moisture is supplied to this moisture expansion material 50e to be rapidly expanded, thereby completely sealing the gap between the tube 10e and the vehicle 20e without gaps.

The state in which the moisture expansion material 50e is fully expanded may allow an end of the moisture expansion material 50e to be completely in contact with an inner surface of the tube 10e. Accordingly, a shape and size of the moisture expansion material 50e may be designed by a shape and size of the vehicle 20e in circumference and longitudinal directions, a shape and size of an inner surface of the tube 10e in circumference and longitudinal directions, and a gap between the vehicle 20e and the tube 10e.

FIGS. 33a and 34a illustrates an example in which the moisture expansion material 50e is installed at the vehicle front head-side. However, the present invention is not limited thereto, for example. it is sufficient if the moisture expansion material 50e is provided in the vehicle circumferential direction such as a front head-side, a middle side, and a rear tail side in the vehicle longitudinal direction. Furthermore, the moisture expansion material 50e is installed to be in close contact with a circumferential surface of the vehicle 20e while the vehicle runs, and in the drawing, it may be easily understood by those skilled in the art to have a predetermined thickness to show the moisture expansion material 50e.

As described above, the vehicle 20e running in the tube that is in the partial vacuum state at a high speed of 1,200 km/h or more by the Kantrowitz Limit during the deceleration and braking using the compressor opening/closing vane 30e according to the first example of the present invention may be decelerated to a speed of 700 km/h or less. Then, when the moisture expansion material 50e is fully expanded, air passing between the tube 10e and the vehicle 20e may be completely blocked to gradually decrease in speed and then stop.

FIG. 35 is an explanatory view illustrating a water supply device for the moisture expansion material according to the second example of the present invention.

As illustrated in FIG. 35, the water supply device for supplying water to the moisture expansion material 50e supplies water to the moisture expansion material 50e, which is a residue of the cooling device linked to the compressor of the vehicle 20e.

That is, since air generated from the front head-side axial compressor of the vehicle 20e exceeds 600° C. or more, the cooling device uses ice (slush) and water to cool the air, and then moisture remains as a residue. The moisture is supplied through by opening and closing a conduit connected to the moisture expansion material 50e from the cooling device during the vehicle deceleration and braking to expand the moisture expansion material 50e.

The moisture expansion material 50e of the present invention may be implemented using a material of which a volume increases when moisture is supplied from the outside while being in a contracted state in a normal time. For example, the moisture expansion material 50e may be made of a mixture of a calcium chloride-impregnated pore structure and superabsorbent polymer (SAP-iMPS-pCC: CaCl2-in-MesoPorous Silica grown on SuperAbsorbent Polymer), an MPS-pCC absorbent material, a zeolite absorbent material, a silica gel absorbent material, or the like. Of these, the mixture of the calcium chloride-impregnated pore structure and the superabsorbent polymer (SAP-iMPS-pCC) is preferred.

FIGS. 36a to 36e are explanatory views illustrating the moisture expansion material according to the second example of the present invention.

When the zeolite absorbent material or the silica gel absorbent material absorb moisture, it is known that its volume is expanded 300 times. When the mixture of the calcium chloride-impregnated pore structure and the superabsorbent polymer (SAP-iMPS-pCC) absorbs moisture, it is known to be a novel chemical material of which a volume is expanded up to 1,000 times. Therefore, irrespective of a design of a gap between the tube 10e and the vehicle 20e, when the mixture of the calcium chloride-impregnated pore structure and the superabsorbent polymer material (SAP-iMPS-pCC) is used as the moisture expansion material 50e, the gap between the tube 10a and the vehicle 20e may be completely sealed without a gap.

Figure 36A:
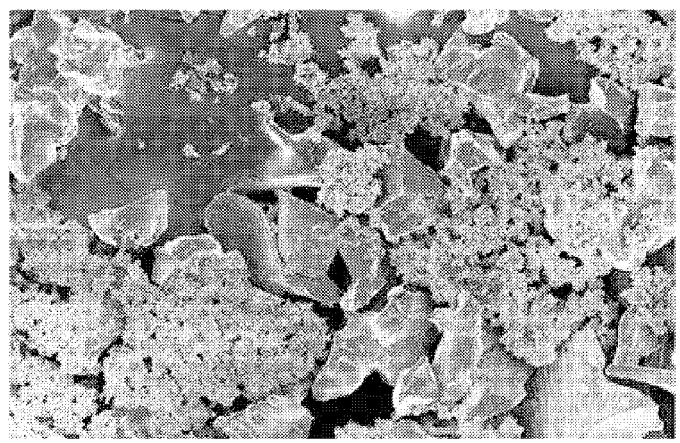

FIG. 36a illustrates a photomicrograph of the mixture of the calcium chloride-impregnated pore structure and the superabsorbent polymer (SAP-iMPS-pCC: CaCl2-in-MesoPorous Silica grown on SuperAbsorbent Polymer). The mixture of the calcium chloride-impregnated pore structure and the superabsorbent polymer (SAP-iMPS-pCC) has capability to absorb moisture up to six times rather than MPS-pCC that is an existing absorbent material.

Figure 36B:
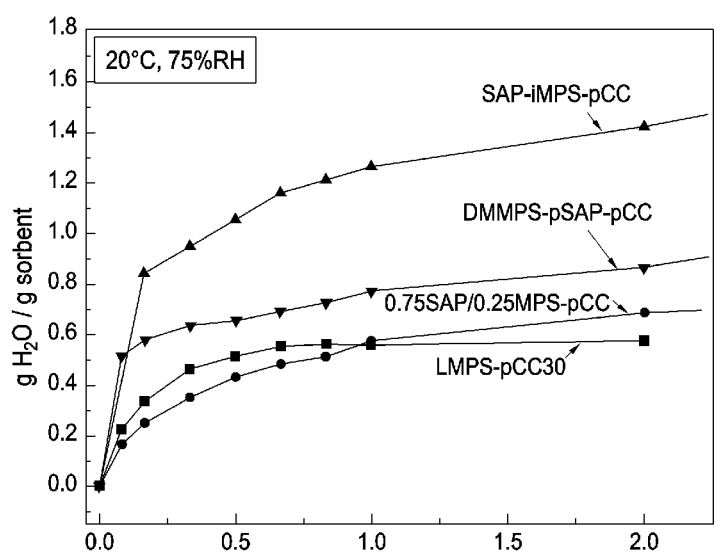

FIG. 36b illustrates moisture absorption capability of the mixture of the calcium chloride-impregnated pore structure and the superabsorbent polymer hybrid material (SAP-iMPS-pCC) under a temperature condition of 20° C.

Figure 36C:
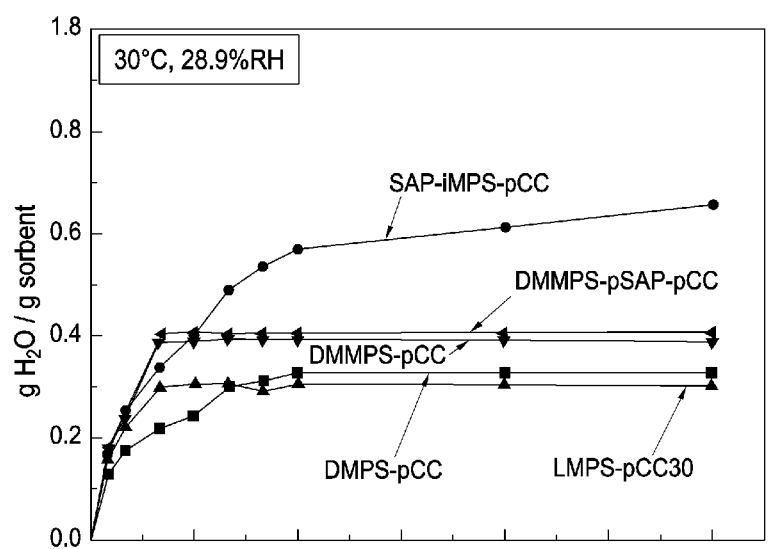

FIG. 36c illustrates moisture absorption capability of the mixture of the calcium chloride-impregnated pore structure and the superabsorbent polymer hybrid material (SAP-iMPS-pCC) under a temperature condition of 30° C.

Figures 36D, 36E:
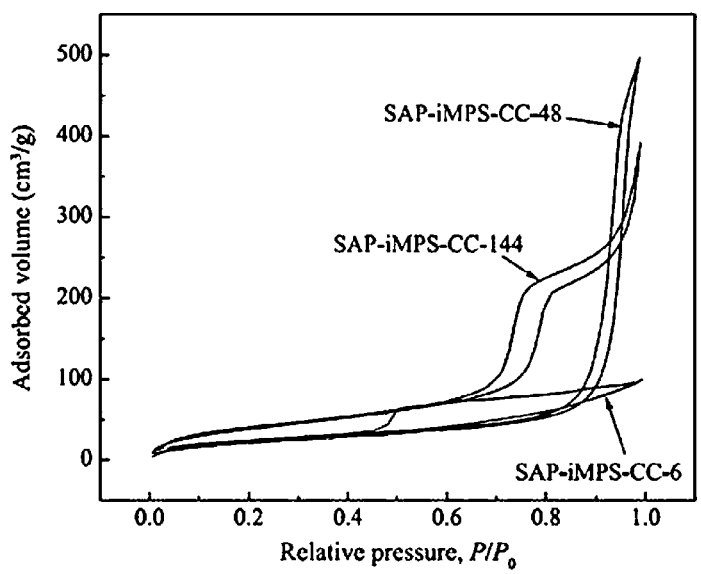

FIG. 36d illustrates moisture absorption capability of the mixture of the calcium chloride-impregnated pore structure and the superabsorbent polymer hybrid material (SAP-iMPS-pCC) under various relative pressures.

FIG. 36e illustrates moisture absorption capability of the mixture of the calcium chloride-impregnated pore structure and the superabsorbent polymer hybrid material (SAP-iMPS-pCC) at various times.

Next, the best mode for carrying out the invention related to a maglev train including the energy harvester according to the present invention and an infrastructure system on which the maglev train runs will be described in detail.

FIG. 37 is a schematic view of a maglev train including an energy harvester according to an embodiment of the present invention, FIG. 38 is a view for explaining the energy harvester according to an embodiment of the present invention, FIG. 39 is a view for explaining a first power generation module according to an embodiment of the present invention, FIG. 40 is a view for explaining a second power generation module and a third power generation module according to an embodiment of the present invention, and FIG. 41 is a view for explaining an infrastructure system according to an embodiment of the present invention.

Hereinafter, a maglev train 10f including an energy harvester according to an embodiment of the present invention (hereinafter, referred to as a 'maglev train 10f') will be described with reference to FIGS. 37 to 40.

Referring to FIG. 37, the maglev train 10f includes a main body 111f of the train, a plurality of electromagnets 12f disposed on left and right surfaces of the main body 11f along a direction in which the maglev train 10f runs, and one or more energy harvesters 100f disposed on the main body 11f to generate power based on vibration of the main body 11f.

In other words, the maglev train 10f is levitated to move by magnetic force on a track 30f. Also, the track 30f is formed to extend in one direction, and a levitation coil 21f may be formed on the left and right surfaces to extend in a longitudinal direction of the track. Furthermore, the plurality of electromagnets 12f and the levitation coil 21f may be disposed to face each other, and thus levitation force and propulsion force may be generated by action between the electromagnet 12f and the levitation coil 21f. However, the present invention is not limited thereto, and the levitation coil 21f serves to levitate and guide the maglev train 10f, and a propulsion coil 29f is additionally disposed on the track 30f to provide the propulsion force to the maglev train. For example, the above-described electromagnet 12f may be a superconducting electromagnet or a permanent magnet, but is not limited thereto.

For example, the plurality of electromagnets 12f may be disposed so that an N polarity and an S polarity are alternately arranged on one side surface along the direction in which the maglev train 10f runs, and an upper electromagnet 13f and a lower electromagnet 14f which will be described later may be arranged so that one surfaces thereof have opposite polarities to each other.

The energy harvester 100f includes a first power generation module 110f that converts vibration generated in the running direction of the main body 11f into electrical energy, a second power generation module 120f that converts vibration generated in a direction of guiding force acting on the main body 11f into electrical energy, and a third power generation module 130f that converts vibration generated in a direction of levitation force acting on the main body 11f into electrical energy.

Hereinafter, the energy harvester 100f according to an embodiment of the present invention will be described in detail with reference to FIGS. 38 and 40.

As described above, the energy harvester 100f includes the first power generation module 110f, the second power generation module 120f, and the third power generation module 130f. Also, the first power generation module 110f, the second power generation module 120f, and the third power generation module 130f correspond to the electromagnets 12f disposed on the left and right surfaces along the direction in which the maglev train 10f runs. Also, the energy harvester 100f may generate electrical energy by electromagnetic induction as the energy harvester 100f vibrates in the running direction, the guiding direction, and the levitation direction of the maglev train 10f.

In detail, referring to FIGS. 38 and 39, the first power generation module 110f includes a first side upper iron core 111f extending in a direction parallel to the running direction of the maglev train 10f and disposed to correspond to a position of the upper electromagnet 13f of the electromagnet 12f disposed at a left side; a first side lower iron core 112f extending in a direction parallel to the running direction of the maglev train 10f and disposed to correspond to a position of the lower electromagnet 14f of the electromagnet 12f disposed at the left side; a second side upper iron core 113f extending in a direction parallel to the running direction of the maglev train 10f and disposed to correspond to a position of the upper electromagnet 13f of the electromagnet 12f disposed at a right side; a second side lower iron core 114f extending in a direction parallel to the running direction of the maglev train 10f and disposed to correspond to a position of the lower electromagnet 14f of the electromagnet 12f disposed on the right side; one or more first side upper coil modules 115f wound around the first side upper iron core 111f; one or more first side lower coil modules 116f wound around the first side lower iron core 112f; one or more second side upper coil modules 117f wound around the second side upper iron core 113f; and one or more second side lower coil modules 118f wound around the second side lower iron core 114f.

That is to say, the plurality of electromagnets 12f may be disposed on the left and right surfaces of the maglev train 10f along the running direction of the magnetic levitation train 10f, respectively. Also, the plurality of electromagnets 12f respectively positioned on the left and right surfaces of the maglev train 10f may include an upper electromagnet 13f and a lower electromagnet 14f that are spaced apart from each other in a vertical direction. Also, in the first power generation module 110f, the upper and lower iron cores 111, 112, 113, and 114 are disposed at positions corresponding to the upper electromagnet 13f and the lower electromagnet 14f, which are disposed on the left and right surfaces, respectively. The coil modules 115f, 116f, 117f, and 118f may be wound around the upper and lower iron cores 111f, 112f, 113f, and 114f, respectively.

Thus, the first power generation module 110f may generate electrical energy by a magnetic flux generated by the electromagnet 12f as the energy harvester 100f vibrates along the running direction of the maglev train 10f.

Referring to FIGS. 38 and 40, the second power generation module 120f includes one or more first side upper horizontal iron cores 121f extending from the first side upper iron core 111f toward the left side of the main body 11f, one or more first side lower horizontal iron cores 122f extending from the first side lower iron core 112f toward the left side of the main body 11f, one or more second side upper horizontal iron cores 123f extending from the second side upper iron core 113f toward the right side of the main body 11f, one or more second side lower horizontal iron cores 124f extending from the second side lower iron cores 114f toward the right side of the main body 11f, one or more first side upper horizontal coil modules 125f wound around the first side upper horizontal iron core 121f, one or more first side lower horizontal coil modules 126f wound around the first side lower horizontal iron core 122f, one or more second side upper horizontal coil modules 127f wound around the second side upper horizontal iron core 123f, and one or more second side lower horizontal coil modules 128f wound around the second side lower horizontal iron core 124f.

That is to say, the second power generation module 120f includes a plurality of upper and lower horizontal iron cores 121f, 122f, 123f, and 124f extending from the upper and lower iron cores 111f, 112f, 113f, and 114f in the direction of the electromagnet 12f of the first power generation module 110f, and the upper and lower horizontal coil modules 125f, 126f, 127f, and 128f may be wound around the upper and lower horizontal iron cores 121f, 122f, 123f, and 124f, respectively.

Thus, the second power generation module 120f may generate electrical energy by a magnetic flux generated by the electromagnet 12f as the energy harvester 100f vibrates along the guiding direction of the maglev train 10f.

Referring to FIGS. 38 and 40, the third power generation module 130f includes one or more first side vertical iron cores 131f extending from the first side upper iron core 111f toward the first side lower iron core, one or more second side vertical iron cores 132f extending from the second side upper iron core 113f toward the second side lower iron core 114f, one or more first side vertical coil modules wound around the first side vertical iron core 131f, and one or more second side vertical coil modules 134f wound around the second side vertical iron core 132f. Also, the third power generation module 130f includes one or more first side vertical iron cores 131f connecting a contact point of the first side upper iron core 111f and the first side upper horizontal iron core 121f to a contact point of the first side lower iron core 112f and the first side lower horizontal iron core 122f, which is disposed thereunder, one or more second side vertical iron cores 132f connecting a contact points of the second side upper iron core 113f and the second side upper horizontal iron core 123f and a contact point between the second side lower iron core 114f and the second side lower horizontal iron core 124f, and one or more first side vertical coil modules 133f wound around the first side vertical iron core 131f and one or more second side vertical coil 134f modules wound around the second side vertical iron core 132f.

That is to say, the third power generation module 130f includes a plurality of vertical iron cores 131f and 132f extending in a vertical direction, that is, in a direction in which the maglev train 10f receives the levitation force, and vertical coil modules 133f and 134f may be wound around the plurality of vertical iron cores 131f and 132f.

Thus, the third power generation module 130f may generate electrical energy by a magnetic flux generated by the electromagnet 12f as the energy harvester 100f vibrates along the levitation direction of the maglev train 10f.

Unlike the general train, the maglev train 10f continuously generates vibrations in the form of frequency, and the energy harvester 100f vibrates in response to the vibration frequency to modulate a resonance frequency, thereby reducing the vibration and to increase in damping force, thereby improving the stability. Also, the maglev train 10f may produce electrical energy using the energy harvester 100f, and thus, there is an effect that maximize energy utilization.

Hereinafter, referring to FIG. 41, an infrastructure system 20f (hereinafter, referred to as an 'infrastructure system 20f') in which the maglev train 10f runs according to an embodiment of the present invention will be described.

The infrastructure system 20f includes one or more levitation coils 21f installed on each side surface along a running path of the maglev train 10f, an energy storage device 22f for storing electrical energy induced in levitation coil 21f, and a controller 23f for controlling an operation of levitation coil 21f and energy storage device 22f. Also, the controller 23f controls induced electromotive force generated as the maglev train 10f, which is generated as the maglev train 10f passes through the levitation coil 21f so as to be stored in the energy storage device 22f.

For example, the levitation coil 21f may apply null flux connection to the upper, lower, left, and right coils for effective levitation and guidance of the maglev train 10f. As described above, the levitation coil 21f may have a structure in which a plurality of levitation coils 21f are disposed on a sidewall along a moving direction of the maglev train 10f. Also, the propulsion coil 29f may be separately disposed between a rear surface and the sidewall of the levitation coil 21f or may be configured so that the levitation coil 21f functions as a propulsion coil 29f.

Furthermore, in the case in which the levitation coil 21f is installed in all the sections, and the propulsion coil 29f is installed only in a partial section, a power supply unit for a sensor 26f, a communication module, and a braking module 28f, which will be described later, has to be provided in a section in which the propulsion coil 29f is not installed, and thus, installation costs may increase. However, the infrastructure system 20f may supply power to the sensor 26f, the communication module 27f, and the braking module 28f by using the energy storage device 22f that stores the electrical energy induced in the levitation coil 21f.

Also, the infrastructure system 20f may further include a separate energy production module, for example, a solar, a piezoelectric, and a thermoelectric element to supply electrical energy produced by the energy production module to the energy storage device 22f. That is to say, when the maglev train 10f operates under a sealed low-pressure environment, the electric energy may be produced using thermoelectric power generation utilizing a low-pressure high-temperature environment or solar power generation installed in an external infrastructure.

Also, the infrastructure system 20f may further include a rectifier circuit 24f connected to an output terminal of the levitation coil 21f to convert AC power into DC power and a regulator 25f which adjusts the output of the rectifier circuit 24f to a predetermined value to supply the power to the energy storage device 22f.

For example, as illustrated in FIG. 41, the infrastructure system 20f connects the rectifier circuit 24f and the energy storage device 22f to the levitation coil 21f in parallel to each other to store the induced electrical energy in the levitation coil 21f.

Also, the infrastructure system 20f may further include one or more sensors 26f that receive power from the energy storage device 22f to detect an operating state of the infrastructure system 20f. The above sensor 26f may be, but is not limited to, a sensor 26f that detects a position of the maglev train 10f.

Also, the infrastructure system 20f may further include the communication module 27f that receives power from the energy storage device 22f to performs data communication. For example, the communication module 27f may transmit information of the sensor 26f through communication with a control center and receive a command from the control center to transmit the received command to the controller 23f.

Also, the infrastructure system 20f may further include the braking module 28f that receives power from the energy storage device 22f to performs an emergency braking operation of the maglev train 10f. For example, the braking module 28f may be, but is not limited to, a valve for a resistive force rising conversion switch, controlling a reverse phase, and changing an air pressure, and the like.

The above description is merely illustrative of the technical idea of the present invention, and those skilled in the art to which the present invention pertains various modifications and variations without departing from the essential characteristics of the present invention. The scope of protection should be interpreted by the following claims, and all technical ideas within the scope equivalent thereto should be construed as being included in the scope of the present invention.

The description of the present invention is intended to be illustrative, and those with ordinary skill in the technical field of the present invention pertains will be understood that the present invention can be carried out in other specific forms without changing the technical idea or essential features. Therefore, the above-disclosed embodiments are to be considered illustrative and not restrictive. For example, each of the components described as a single part may be divided for use as a plurality of parts. Conversely, the components described as a plurality of parts may be combined for use as a single part.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

It will be apparent to those skilled in the art that various modifications and variations can be made in the present invention. Thus, it is intended that the present invention covers the modifications and variations of this invention provided they come within the scope of the appended claims and their equivalents.

In the detailed description of the present invention, specific embodiments have been described, but various modifications are possible without departing from the scope of the present invention. Therefore, the scope of the present invention should not be limited to the described embodiments, but should be defined not only by the scope of the following claims, but also by the equivalents of the claims.

The invention claimed is:

1. A hypertube transport system comprising:
    a sealing part having an internal space that is isolated from an external atmospheric pressure side; and
    a vehicle constituted by a vehicle body and a bogie to run in the sealing part,
    wherein a superconducting electromagnet is provided in the bogie of the vehicle, and an electromagnetic rail is provided on an inner wall of the sealing part so that the vehicle runs by electromagnetic force between the superconducting electromagnet on the bogie of the vehicle and the electromagnetic rail on the inner wall of the sealing part,
    the hypertube transport system comprises a disturbance impact attenuator provided at a vehicle-side to attenuate a disturbance impact caused by electromagnetic force, vibration, air resistance, or an irregular air flow, which is generated when the vehicle runs in the sealing part that is in a partial vacuum state, and
    the hypertube transport system comprises a superconducting switch provided at a side of the superconducting electromagnet to perform switching between a charging mode and a permanent current mode, and
    wherein the superconducting switch comprises:
    a case;
    a superconducting wire comprising a pair of first and second wire units overlapping each other;

a bobbin formed at a central portion of the case so that the superconducting wire is wound around the bobbin; and
a heater installed in a central space of the bobbin to generate heat when current is applied from an external power source,
wherein the first and second wire units are wound several times between a sidewall of the case and the bobbin.

2. The hypertube transport system of claim 1, wherein ends of the first and second wire units, which are connected to each other, extend in a rounded shape so that one end of the first wire unit and one end of the second wire unit are spaced apart from each other and extend to be adjacent to overlap each other until the one end of the first wire unit and the one end of the second wire unit reach both ends.

3. The hypertube transport system of claim 1, wherein entire outer circumferential surfaces of the first and second wire units are covered by an insulator to be insulated from each other and are insulated from the bobbin.

4. The hypertube transport system of claim 1, wherein the disturbance impact attenuator comprises an electromagnetic force damper configured to prevent the external disturbance impact due to the electromagnetic force from being transmitted from a side of the bogie of the vehicle to a side of the vehicle body.

5. The hypertube transport system of claim 4, wherein the electromagnetic force damper is installed on a front end of the superconducting electromagnet, which is installed on the vehicle bogie to face the sealing part inner wall-side electromagnetic rail, to attenuate electromagnetic vibration generated between the sealing part inner wall-side electromagnetic rail and the vehicle bogie-side superconducting electromagnet.

6. A hypertube transport system comprising:
a sealing part having an internal space that is isolated from an external atmospheric pressure side;
a vehicle constituted by a vehicle body and a bogie to run in the sealing part; and
one or more energy harvesters disposed in the vehicle to generate power based on the vibration of the vehicle,
wherein a superconducting electromagnet is provided in the bogie of the vehicle, and an electromagnetic rail is provided on an inner wall of the sealing part so that the vehicle runs by electromagnetic force between the superconducting electromagnet on the bogie of the vehicle and the electromagnetic rail on the inner wall of the sealing part,
the hypertube transport system comprises a disturbance impact attenuator provided at a vehicle-side to attenuate a disturbance impact caused by electromagnetic force, vibration, air resistance, or an irregular air flow, which is generated when the vehicle runs in the sealing part that is in a partial vacuum state, and
the hypertube transport system comprises a superconducting switch provided at a side of the superconducting electromagnet to perform switching between a charging mode and a permanent current mode, and
wherein each of the one or more energy harvesters comprises:
a first power generation module configured to convert vibration generated along a running direction of the vehicle into electrical energy;
a second power generation module configured to convert vibration generated along a direction of guiding force acting on the vehicle into electrical energy; and
a third power generation module configured to convert vibration generated along a direction of levitation force acting on the vehicle into electrical energy.

7. The hypertube transport system of claim 6, wherein the first power generation module comprises a plurality of iron cores extending in a direction parallel to a proceeding direction of the vehicle and a coil wound around each of the iron cores, wherein the first power generation module converts the vibration generated in the proceeding direction of the vehicle into electrical energy,
the second power generation module comprises a plurality of horizontal iron cores extending from the iron cores in a direction in which the superconducting electromagnet is disposed and a horizontal coil wound around each of the horizontal iron cores, wherein the second power generation module converts the vibration generated along the direction of the guiding force acting on the vehicle into electrical energy,
the third power generation module converts the vibration generated along the direction of the levitation force acting on the vehicle into electrical energy, and
the first to third power generation modules generate electrical energy by a magnetic flux generated by the superconducting electromagnet.

8. The hypertube transport system of claim 1, further comprising:
a first electromagnet disposed at a front head of the vehicle;
a second electromagnet disposed at a rear tail of the vehicle; and
a power supply configured to supply power to the first electromagnet and the second electromagnet,
wherein the front head and rear tail of the vehicle are respectively magnetized with a first polarity and a second polarity through the first electromagnet and the second electromagnet by a control of the power supply to brake the vehicle.

9. The hypertube transport system of claim 8, wherein the power supply supplies current to the first electromagnet and the second electromagnet to magnetize the front head of the vehicle with the first polarity and magnetize the rear tail of the vehicle with the second polarity so that a specific point of the sealing part has the same polarity as the first electromagnet, a repulsive force acts between the specific point of the sealing part and the front head of the vehicle, and an attractive force acts between the specific point of the sealing part and the rear tail of the vehicle, thereby braking the vehicle.

10. A hypertube transport system comprising:
a sealing part having an internal space that is isolated from an external atmospheric pressure side;
a vehicle constituted by a vehicle body and a bogie to run in the sealing part; and
an air flow blocking part installed at the vehicle-side to block a flow of air passing through a front head-side of the vehicle or block a flow of air passing through a gap between the vehicle and the sealing part tube,
wherein a superconducting electromagnet is provided in the bogie of the vehicle, and an electromagnetic rail is provided on an inner wall of the sealing part so that the vehicle runs by electromagnetic force between the superconducting electromagnet on the bogie of the vehicle and the electromagnetic rail on the inner wall of the sealing part,
the hypertube transport system comprises a disturbance impact attenuator provided at a vehicle-side to attenuate a disturbance impact caused by electromagnetic force, vibration, air resistance, or an irregular air flow, which is generated when the vehicle runs in the sealing part that is in a partial vacuum state, and the hypertube transport system comprises a superconducting switch provided at a side of the superconducting electromagnet to perform switching between a charging mode and a permanent current mode, and wherein the vehicle is decelerated and braked by a control operation of the air flow blocking part, the air flow blocking part comprises a compressor opening/closing vane, and the compressor opening/closing vane is installed at a front end of a compressor at the front head-side so that the vane is closed to block an introduction of the air into the compressor when decelerating and braking the vehicle.

11. A hypertube transport system comprising:

a sealing part having an internal space that is isolated from an external atmospheric pressure side;

a vehicle constituted by a vehicle body and a bogie to run in the sealing part; and an air flow blocking part installed at the vehicle-side to block a flow of air passing through a front head-side of the vehicle or block a flow of air passing through a gap between the vehicle and the sealing part, wherein a superconducting electromagnet is provided in the bogie of the vehicle, and an electromagnetic rail is provided on an inner wall of the sealing part so that the vehicle runs by electromagnetic force between the superconducting electromagnet on the bogie of the vehicle and the electromagnetic rail on the inner wall of the sealing part, the hypertube transport system comprises a disturbance impact attenuator provided at a vehicle-side to attenuate a disturbance impact caused by electromagnetic force, vibration, air resistance, or an irregular air flow, which is generated when the vehicle runs in the sealing part that is in a partial vacuum state, and the hypertube transport system comprises a superconducting switch provided at a side of the superconducting electromagnet to perform switching between a charging mode and a permanent current mode, and wherein the vehicle is decelerated and braked by a control operation of the air flow blocking part, the air flow blocking part comprises a moisture expansion material, and the moisture expansion material is installed in a circumferential direction of the vehicle so that the material is expanded to block air passing through a gap between the tube and the vehicle when decelerating and braking the vehicle.

12. The hypertube transport system of claim 11, wherein the moisture expansion material comprises a mixture of a calcium chloride-impregnated pore structure and superabsorbent polymer (SAP-iMPS-pCC: CaCl2-in-MesoPorous Silica grown on SuperAbsorbent Polymer), an MPS-pCC absorbent material, a zeolite absorbent material, a silica gel absorbent material, or the like.

13. The hypertube transport system of claim 1, wherein a refrigerant for cooling compressed air is provided at the vehicle-side, and the refrigerant for cooling the compressed air comprises a mixture in which a mixture of propanediol ($C_3H_8O_2$) and ethylene glycol ($C_2H_6O_2$) is mixed with slush in which ice and water are mixed.

14. The hypertube transport system of claim 13, wherein the slush, in which the ice and the water are mixed, and a mixture of propanediol ($C_3H_8O_2$) and ethylene glycol ($C_2H_6O_2$) are mixed at a weight ratio of 1:9.

* * * * *